US011502790B2

(12) United States Patent
Huang et al.

(10) Patent No.: US 11,502,790 B2
(45) Date of Patent: Nov. 15, 2022

(54) ORTHOGONAL SEQUENCE GENERATION FOR MULTI-BIT PAYLOADS

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Wanshi Chen, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 85 days.

(21) Appl. No.: 17/180,639

(22) Filed: Feb. 19, 2021

(65) Prior Publication Data
US 2021/0320762 A1     Oct. 14, 2021

Related U.S. Application Data

(60) Provisional application No. 63/007,926, filed on Apr. 9, 2020, provisional application No. 63/029,269, filed on May 22, 2020.

(51) Int. Cl.
*H04L 5/00* (2006.01)
*H04B 7/0456* (2017.01)

(52) U.S. Cl.
CPC ......... *H04L 5/0007* (2013.01); *H04B 7/0456* (2013.01); *H04L 5/0044* (2013.01)

(58) Field of Classification Search
CPC . H04L 5/0007; H04L 5/0044; H04L 27/2602; H04L 27/2601; H04L 27/20;
(Continued)

(56) References Cited

U.S. PATENT DOCUMENTS

2007/0140105 A1   6/2007 Coon
2008/0069186 A1   3/2008 Rice
(Continued)

OTHER PUBLICATIONS

Ericsson: "On the Design of Long PUCCH for More than 2 Bits UCI", 3GPP TSG-RAN WG1 Meeting #90, 3GPP Draft, R1-1714423, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051317202, 10 pages, Retrieved from the Internet: URL:http://www.3gpp.org/ftp/Meetings_3GPP_SYNC/RAN1/Docs/ [retrieved on Aug. 20, 2017], Figures 2, 3, Section 2.
(Continued)

*Primary Examiner* — Khanh C Tran
(74) *Attorney, Agent, or Firm* — Holland & Hart LLP

(57) ABSTRACT

Methods, systems, and devices for wireless communications are described. In some systems, a user equipment (UE) or a base station, or both, may generate a set of orthogonal sequences that the UE may use to convey a payload of a number of bits based on a product of an orthogonal matrix and a cell-specific sequence. The UE or the base station, or both, may select a subset of the set of orthogonal sequences based on the number of bits in the payload, and the UE may construct a codebook including the subset of orthogonal sequences. The UE may select an orthogonal sequence from the constructed codebook based on the bits in the payload. The UE may transmit the payload including the number of bits to the base station using the selected orthogonal sequence.

30 Claims, 23 Drawing Sheets

(58) Field of Classification Search
CPC .. H04B 7/0456; H04B 7/0639; H04B 7/0478; H04B 1/69
See application file for complete search history.

(56) References Cited

U.S. PATENT DOCUMENTS

| | | | |
|---|---|---|---|
| 2010/0322290 A1 | 12/2010 | Kang et al. | |
| 2013/0223482 A1* | 8/2013 | Pourahmadi | H04J 13/0003 375/147 |
| 2013/0343322 A1* | 12/2013 | Lee | H04J 13/18 370/329 |
| 2016/0173212 A1* | 6/2016 | Park | H04J 13/004 375/296 |
| 2019/0149258 A1* | 5/2019 | Araki | H04B 10/0731 398/83 |
| 2019/0335469 A1 | 10/2019 | Si et al. | |

OTHER PUBLICATIONS

Partial International Search Report—PCT/US2021/019058—ISA/EPO—dated Jun. 2, 2021.
International Search Report and Written Opinion—PCT/US2021/019058—ISA/EPO—dated Jul. 23, 2021.

* cited by examiner $$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix}$$

Column $n$ (indicated); Row $n$ (indicated) — 300

$$S(m) = \begin{bmatrix} S(M-1)\, e^{j2\pi(M-1)m/M} \\ \vdots \\ S(l)\, e^{j2\pi l m/M} \\ \vdots \\ S(2)\, e^{j2\pi 2 m/M} \\ S(1)\, e^{j2\pi 1 m/M} \\ S(0)\, e^{j2\pi 0 m/M} \end{bmatrix}$$

Tone Index ↑ ← Tone Index $l$ — 301

FIG. 3A

ORTHOGONAL SEQUENCE GENERATION FOR MULTI-BIT PAYLOADS

CROSS REFERENCE

The present application for patent claims the benefit of U.S. Provisional Patent Application No. 63/007,926 by HUANG et al., entitled "ORTHOGONAL SEQUENCE GENERATION FOR MULTI-BIT PAYLOADS," filed Apr. 9, 2020, and the benefit of U.S. Provisional Patent Application No. 63/029,269 by HUANG et al., entitled "ORTHOGONAL SEQUENCE GENERATION FOR MULTI-BIT PAYLOADS," filed May 22, 2020, each of which is assigned to the assignee hereof, and each of which is expressly incorporated by reference herein.

FIELD OF TECHNOLOGY

The following relates generally to wireless communications and more specifically to orthogonal sequence generation for multi-bit payloads.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may transmit a signal to a base station including a payload. In some cases, the UE may transmit the payload in a resource allocation according to a selected non-orthogonal sequence, which the UE may select out of a set of non-orthogonal sequences. Non-orthogonal sequences, however, may introduce interference or otherwise cause a decrease in reception accuracy or reliability at the base station.

SUMMARY

The described techniques relate to improved methods, systems, devices, and apparatuses that support orthogonal sequence generation for multi-bit payloads. Generally, the described techniques provide for generating a set of orthogonal sequences that a user equipment (UE) may use to convey a payload including a number of bits. The UE or the base station, or both, may generate the set of orthogonal sequences based on determining a product of an orthogonal matrix and a cyclically shifted base sequence (e.g., a cyclically shifted cell-specific base sequence). The orthogonal matrix may have a size (e.g., a number of rows and a number of columns) corresponding to a number of time periods, such as symbol periods, of a resource allocation in which the UE may transmit the payload, and the cyclically shifted base sequence may have a size (e.g., a length) corresponding to a number of frequency tones, or subcarriers, of the resource allocation. In some examples, the set of orthogonal sequences may be generated by determining a Kronecker product of each row or column of the orthogonal matrix and each cyclically shifted base sequence. As such, the UE or the base station, or both, may determine a number of orthogonal sequences equal to the product of the number of time periods in the resource allocation and the number of the frequency tones in the resource allocation. Each orthogonal sequence may have a length that is also equal to the product of the number of time periods in the resource allocation and the number of the frequency tones in the resource allocation.

The UE or the base station, or both, may select a subset of the generated set of orthogonal sequences based on the number of bits in the payload. For example, the UE or the base station, or both, may select, for inclusion in the subset, a number of orthogonal sequences such that each bit value of the payload (e.g., each permutation of the number of bits in the payload) may correspond to a different orthogonal sequence. The UE or the base station, or both, may construct a codebook and include the selected subset of the set of orthogonal sequences in the constructed codebook. In some examples, the UE may select a sequence from the constructed codebook based on a decimal number conversion corresponding to a bit stream of the payload. For example, the UE may convert the bit stream into a decimal number and may map the decimal number to an index in the constructed codebook and, as such, the UE may select an orthogonal sequence from the codebook corresponding to the determined index. Accordingly, the UE may transmit, to the base station, the payload using the selected sequence.

A method of wireless communications at a wireless device is described. The method may include identifying a set of orthogonal sequences for conveying a payload including a set of bits, where a number of the set of orthogonal sequences is based on a number of time periods for conveying the payload and a number of frequency tones for conveying the payload, selecting a subset of the set of orthogonal sequences for conveying the payload, where a size of the subset of the set of orthogonal sequences is based on a number of the set of bits, selecting a sequence from the subset of the set of orthogonal sequences based on a mapping between the subset of the set of orthogonal sequences and the set of bits, and transmitting the payload including the set of bits using the selected sequence.

An apparatus for wireless communications at a wireless device is described. The apparatus may include a processor, memory coupled with the processor, and instructions stored in the memory. The instructions may be executable by the processor to cause the apparatus to identify a set of orthogonal sequences for conveying a payload including a set of bits, where a number of the set of orthogonal sequences is based on a number of time periods for conveying the payload and a number of frequency tones for conveying the payload, select a subset of the set of orthogonal sequences for conveying the payload, where a size of the subset of the set of orthogonal sequences is based on a number of the set of bits, select a sequence from the subset of the set of orthogonal sequences based on a mapping between the subset of the set of orthogonal sequences and the set of bits, and transmit the payload including the set of bits using the selected sequence.

Another apparatus for wireless communications at a wireless device is described. The apparatus may include means for identifying a set of orthogonal sequences for conveying a payload including a set of bits, where a number of the set of orthogonal sequences is based on a number of time periods for conveying the payload and a number of frequency tones for conveying the payload, selecting a subset of the set of orthogonal sequences for conveying the payload, where a size of the subset of the set of orthogonal sequences is based on a number of the set of bits, selecting a sequence from the subset of the set of orthogonal sequences based on a mapping between the subset of the set of orthogonal sequences and the set of bits, and transmitting the payload including the set of bits using the selected sequence.

A non-transitory computer-readable medium storing code for wireless communications at a wireless device is described. The code may include instructions executable by a processor to identify a set of orthogonal sequences for conveying a payload including a set of bits, where a number of the set of orthogonal sequences is based on a number of time periods for conveying the payload and a number of frequency tones for conveying the payload, select a subset of the set of orthogonal sequences for conveying the payload, where a size of the subset of the set of orthogonal sequences is based on a number of the set of bits, select a sequence from the subset of the set of orthogonal sequences based on a mapping between the subset of the set of orthogonal sequences and the set of bits, and transmit the payload including the set of bits using the selected sequence.

Some examples of the method, apparatuses, and non-transitory computer-readable medium described herein may further include operations, features, means, or instructions for generating the set of orthogonal sequences based on a product of an orthogonal matrix having a size corresponding to the number of time periods and a cyclically shifted cell-specific sequence having a length corresponding to the number of frequency tones.

Some examples of the method, apparatuses, and non-transitory computer-readable medium described herein may further include operations, features, means, or instructions for identifying a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence.

Some examples of the method, apparatuses, and non-transitory computer-readable medium described herein may further include operations, features, means, or instructions for determining the subset of the set of orthogonal sequences based on the first number, the first starting index, the first index interval, the second number, the second starting index, and the second index interval.

Some examples of the method, apparatuses, and non-transitory computer-readable medium described herein may further include operations, features, means, or instructions for determining a first number of indices associated with the orthogonal matrix based on the first number, and determining a second number of indices associated with the cyclically shifted cell-specific sequence based on the second number.

In some examples of the method, apparatuses, and non-transitory computer-readable medium described herein, the first index interval includes a function of the number of time periods and the second index interval includes a function of the number of frequency tones.

In some examples of the method, apparatuses, and non-transitory computer-readable medium described herein, the function of the number of time periods and the function of the number of frequency tones each further includes a modulo function, a floor function, a ceiling function, or a combination thereof.

Some examples of the method, apparatuses, and non-transitory computer-readable medium described herein may further include operations, features, means, or instructions for receiving an indication of the first number, an indication of the second number, or both.

Some examples of the method, apparatuses, and non-transitory computer-readable medium described herein may further include operations, features, means, or instructions for receiving an indication of the first starting index, an indication of the second starting index, or both.

Some examples of the method, apparatuses, and non-transitory computer-readable medium described herein may further include operations, features, means, or instructions for receiving an indication of the first index interval, an indication of the second index interval, or both.

Some examples of the method, apparatuses, and non-transitory computer-readable medium described herein may further include operations, features, means, or instructions for determining the first index interval based on a maximum index interval for indices of the orthogonal matrix, and determining the second index interval based on a maximum index interval for indices of the cyclically shifted cell-specific sequence.

In some examples of the method, apparatuses, and non-transitory computer-readable medium described herein, a summation of the first number associated with the orthogonal matrix and the second number associated with the cyclically shifted cell-specific sequence equals the number of the set of bits.

Some examples of the method, apparatuses, and non-transitory computer-readable medium described herein may further include operations, features, means, or instructions for identifying a set of joint indices based on a product of the number of time periods and the number of frequency tones.

Some examples of the method, apparatuses, and non-transitory computer-readable medium described herein may further include operations, features, means, or instructions for identifying a third starting index associated with the set of joint indices and a third index interval associated with the set of joint indices.

Some examples of the method, apparatuses, and non-transitory computer-readable medium described herein may further include operations, features, means, or instructions for determining the subset of the set of orthogonal sequences based on the third starting index and the third index interval.

Some examples of the method, apparatuses, and non-transitory computer-readable medium described herein may further include operations, features, means, or instructions for receiving an indication of the third starting index.

Some examples of the method, apparatuses, and non-transitory computer-readable medium described herein may further include operations, features, means, or instructions for receiving an indication of the third index interval.

Some examples of the method, apparatuses, and non-transitory computer-readable medium described herein may further include operations, features, means, or instructions for determining the third index interval based on a maximum index interval for indices of the set of joint indices.

Some examples of the method, apparatuses, and non-transitory computer-readable medium described herein may further include operations, features, means, or instructions for converting the set of bits into a decimal number, where the mapping between the subset of the set of orthogonal sequences and the set of bits may be based on a second mapping between the decimal number and an index of the subset of the set of orthogonal sequences.

In some examples of the method, apparatuses, and non-transitory computer-readable medium described herein, the product includes a Kronecker product.

In some examples of the method, apparatuses, and non-transitory computer-readable medium described herein, the orthogonal matrix includes a discrete Fourier transform (DFT) matrix.

In some examples of the method, apparatuses, and non-transitory computer-readable medium described herein, the subset of the set of orthogonal sequences includes a codebook for conveying the payload including the set of bits.

In some examples of the method, apparatuses, and non-transitory computer-readable medium described herein, the wireless device may be a UE and transmitting the payload may include transmitting the payload on an uplink channel.

In some examples of the method, apparatuses, and non-transitory computer-readable medium described herein, the payload including the set of bits includes an uplink control information message.

In some examples of the method, apparatuses, and non-transitory computer-readable medium described herein, the wireless device may be a UE and transmitting the payload may include transmitting the payload on a sidelink channel.

In some examples of the method, apparatuses, and non-transitory computer-readable medium described herein, the wireless device may be a base station and transmitting the payload may include transmitting the payload on a downlink channel.

A method of wireless communications at a wireless device is described. The method may include identifying a set of orthogonal sequences for conveying a payload including a set of bits, where a number of the set of orthogonal sequences is based on a number of time periods for conveying the payload and a number of frequency tones for conveying the payload, determining a subset of the set of orthogonal sequences for conveying the payload, where a size of the subset of the set of orthogonal sequences is based on a number of the set of bits, and receiving the payload including the set of bits using a selected sequence from the subset of the set of orthogonal sequences, the selected sequence based on a mapping between the subset of the set of orthogonal sequences and the set of bits.

An apparatus for wireless communications at a wireless device is described. The apparatus may include a processor, memory coupled with the processor, and instructions stored in the memory. The instructions may be executable by the processor to cause the apparatus to identify a set of orthogonal sequences for conveying a payload including a set of bits, where a number of the set of orthogonal sequences is based on a number of time periods for conveying the payload and a number of frequency tones for conveying the payload, determine a subset of the set of orthogonal sequences for conveying the payload, where a size of the subset of the set of orthogonal sequences is based on a number of the set of bits, and receive the payload including the set of bits using a selected sequence from the subset of the set of orthogonal sequences, the selected sequence based on a mapping between the subset of the set of orthogonal sequences and the set of bits.

Another apparatus for wireless communications at a wireless device is described. The apparatus may include means for identifying a set of orthogonal sequences for conveying a payload including a set of bits, where a number of the set of orthogonal sequences is based on a number of time periods for conveying the payload and a number of frequency tones for conveying the payload, determining a subset of the set of orthogonal sequences for conveying the payload, where a size of the subset of the set of orthogonal sequences is based on a number of the set of bits, and receiving the payload including the set of bits using a selected sequence from the subset of the set of orthogonal sequences, the selected sequence based on a mapping between the subset of the set of orthogonal sequences and the set of bits.

A non-transitory computer-readable medium storing code for wireless communications at a wireless device is described. The code may include instructions executable by a processor to identify a set of orthogonal sequences for conveying a payload including a set of bits, where a number of the set of orthogonal sequences is based on a number of time periods for conveying the payload and a number of frequency tones for conveying the payload, determine a subset of the set of orthogonal sequences for conveying the payload, where a size of the subset of the set of orthogonal sequences is based on a number of the set of bits, and receive the payload including the set of bits using a selected sequence from the subset of the set of orthogonal sequences, the selected sequence based on a mapping between the subset of the set of orthogonal sequences and the set of bits.

Some examples of the method, apparatuses, and non-transitory computer-readable medium described herein may further include operations, features, means, or instructions for generating the set of orthogonal sequences based on a product of an orthogonal matrix having a size corresponding to the number of time periods and a cyclically shifted cell-specific sequence having a length corresponding to the number of frequency tones.

Some examples of the method, apparatuses, and non-transitory computer-readable medium described herein may further include operations, features, means, or instructions for identifying a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence.

Some examples of the method, apparatuses, and non-transitory computer-readable medium described herein may further include operations, features, means, or instructions for determining the subset of the set of orthogonal sequences based on the first number, the first starting index, the first index interval, the second number, the second starting index, and the second index interval.

Some examples of the method, apparatuses, and non-transitory computer-readable medium described herein may further include operations, features, means, or instructions for determining a first number of indices associated with the orthogonal matrix based on the first number, and determining a second number of indices associated with the cyclically shifted cell-specific sequence based on the second number.

In some examples of the method, apparatuses, and non-transitory computer-readable medium described herein, the first index interval includes a function of the number of time periods and the first number of indices and the second index interval includes a function of the number of frequency tones and the second number of indices.

In some examples of the method, apparatuses, and non-transitory computer-readable medium described herein, the function of the number of time periods and the function of the number of frequency tones each further includes a modulo function, a floor function, a ceiling function, or a combination thereof.

Some examples of the method, apparatuses, and non-transitory computer-readable medium described herein may further include operations, features, means, or instructions for transmitting an indication of the first number, an indication of the second number, or both.

Some examples of the method, apparatuses, and non-transitory computer-readable medium described herein may further include operations, features, means, or instructions for transmitting an indication of the first starting index, an indication of the second starting index, or both.

Some examples of the method, apparatuses, and non-transitory computer-readable medium described herein may further include operations, features, means, or instructions for transmitting an indication of the first index interval, an indication of the second index interval or both.

In some examples of the method, apparatuses, and non-transitory computer-readable medium described herein, a summation of the first number associated with the orthogonal matrix and the second number associated with the cyclically shifted cell-specific sequence equals the number of the set of bits.

Some examples of the method, apparatuses, and non-transitory computer-readable medium described herein may further include operations, features, means, or instructions for identifying a set of joint indices based on a product of the number of time periods and the number of frequency tones.

Some examples of the method, apparatuses, and non-transitory computer-readable medium described herein may further include operations, features, means, or instructions for identifying a third starting index associated with the set of joint indices and a third index interval associated with the set of joint indices.

Some examples of the method, apparatuses, and non-transitory computer-readable medium described herein may further include operations, features, means, or instructions for determining the subset of the set of orthogonal sequences based on the third starting index and the third index interval.

Some examples of the method, apparatuses, and non-transitory computer-readable medium described herein may further include operations, features, means, or instructions for transmitting an indication of the third starting index.

Some examples of the method, apparatuses, and non-transitory computer-readable medium described herein may further include operations, features, means, or instructions for transmitting an indication of the third index interval.

In some examples of the method, apparatuses, and non-transitory computer-readable medium described herein, the product includes a Kronecker product.

In some examples of the method, apparatuses, and non-transitory computer-readable medium described herein, the orthogonal matrix includes a DFT matrix.

In some examples of the method, apparatuses, and non-transitory computer-readable medium described herein, the subset of the set of orthogonal sequences includes a codebook for conveying the payload including the set of bits.

In some examples of the method, apparatuses, and non-transitory computer-readable medium described herein, the wireless device may be a base station and receiving the payload may include receiving the payload on an uplink channel.

In some examples of the method, apparatuses, and non-transitory computer-readable medium described herein, the payload including the set of bits includes an uplink control information message.

In some examples of the method, apparatuses, and non-transitory computer-readable medium described herein, the wireless device may be a UE and receiving the payload may include receiving the payload on a sidelink channel.

In some examples of the method, apparatuses, and non-transitory computer-readable medium described herein, the wireless device may be a UE and receiving the payload may include receiving the payload on a downlink channel.

BRIEF DESCRIPTION OF THE DRAWINGS

FIG. 3A illustrates examples of an orthogonal matrix and a base sequence that support orthogonal sequence generation for multi-bit payloads in accordance with aspects of the present disclosure.

DETAILED DESCRIPTION

Figure 1:
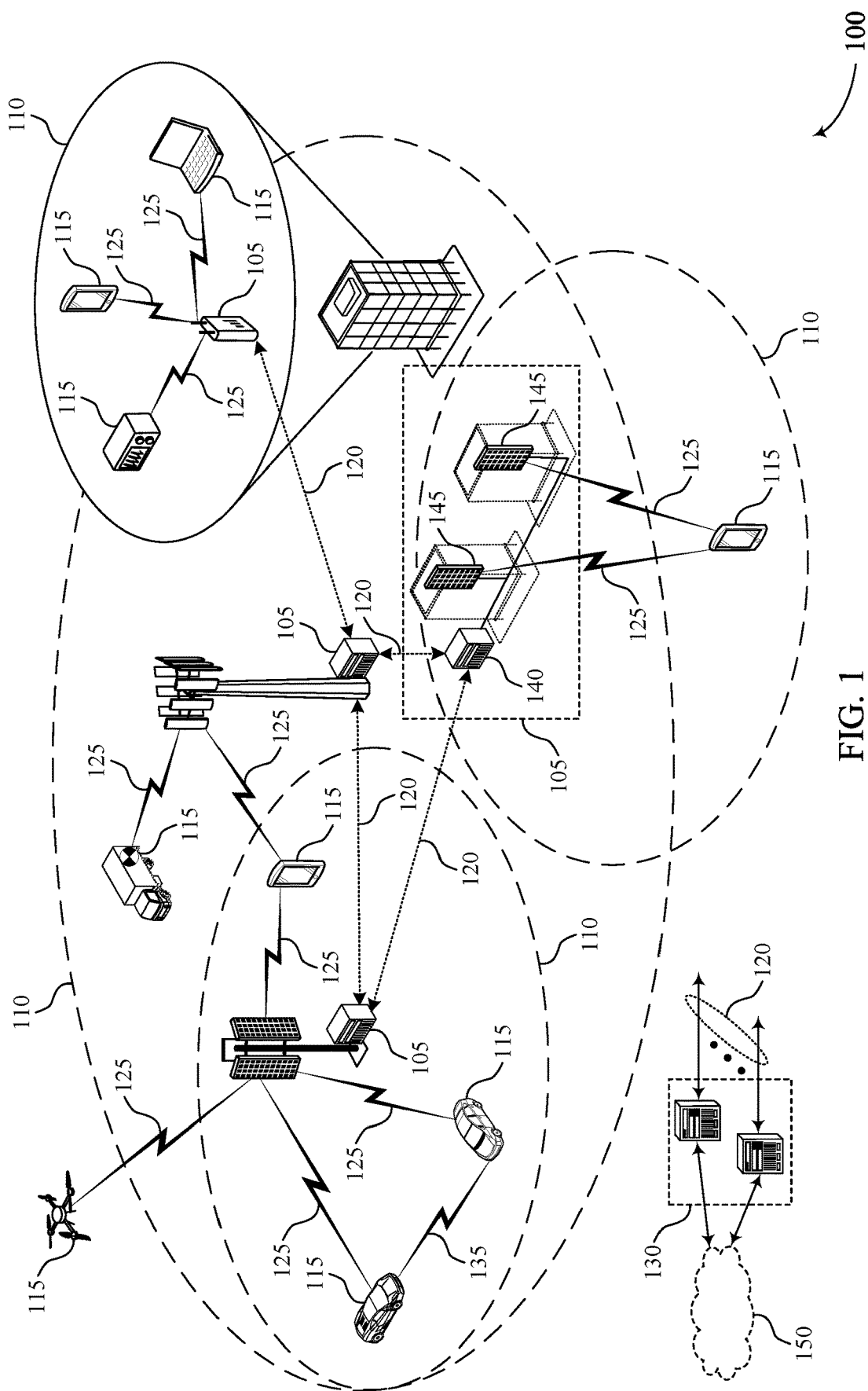
FIG. 1 illustrates an example of a wireless communications system that supports orthogonal sequence generation for multi-bit payloads in accordance with aspects of the present disclosure.

Wireless communications systems may support communications between a user equipment (UE) and a base station. The UE and the base station may communicate over a channel allocated to communication between the UE and the base station. In some cases, the UE and the base station may transmit signals comprising a payload, such as a number of bits of information, to each other over the allocated resources in the channel. For example, the UE may transmit, to the base station, the payload of the signal according to a selected sequence (or codepoint) associated with the allocated resources. In some cases, the UE may use a non-orthogonal sequence to convey the payload. In some systems, however, such as fifth generation (5G) New Radio (NR) systems, the use of non-orthogonal sequences may fail to provide reliable and low-latency communication. For example, the UE, using non-orthogonal sequences for payload transmissions, may fail to meet reliability and low-latency constraints associated with communications over high-frequency radio frequency bands (e.g., FR2 radio frequency bands).

In some examples, the UE or the base station, or both, may generate a set of orthogonal sequences for conveying a payload from the UE to the base station. For example, the UE or the base station, or both, may generate the set of orthogonal sequences based on a product (e.g., a Kronecker product) of an orthogonal matrix and a cell-specific base sequence. In some implementations, the orthogonal matrix may be a square matrix having a size corresponding to a number of orthogonal frequency division multiplexing (OFDM) symbols in a resource allocation over which the UE is configured to transmit the payload. The cell-specific base sequence may be a vector having a size corresponding to a number of frequency tones, or subcarriers, in the resource allocation over which the UE is configured to transmit the payload. The product of the orthogonal matrix and the cell-specific base sequence may generate the set of orthogonal sequences and each orthogonal sequence may have a length corresponding to the number of OFDM symbols multiplied by the number of frequency tones in the resource allocation. In some aspects, the set of orthogonal sequences may be orthogonal in the time-domain and the frequency-domain.

The UE or the base station, or both, may select a subset of the set of orthogonal sequences and the UE may store the subset of orthogonal sequences in a constructed codebook. In some implementations, a quantity of orthogonal sequences in the subset of orthogonal sequences may be based on the number of bits included in the payload, and each orthogonal sequence of the subset of orthogonal sequences may be associated with an index in the constructed codebook. In some examples, the UE may select an orthogonal sequence from the constructed codebook based on the bits of the payload. For example, the UE may determine a bit stream of the payload and may convert the bit stream into a decimal number. The decimal number may correspond to an index in the constructed codebook and, as such, the UE may select the orthogonal sequence from the constructed codebook that is associated with the index corresponding to the decimal number. Accordingly, the UE may transmit, to the base station the payload including the plurality of bits using the selected orthogonal sequence.

Particular aspects of the subject matter described herein may be implemented to realize one or more potential advantages. The described techniques may provide for efficient construction of a codebook including a number of orthogonal sequences based on a number of bits of a payload to be transmitted from the UE to the base station. As such, the UE may avoid storing more sequences than necessary to convey the payload. Additionally, the use of orthogonal sequences may provide for lower latency and more reliable communications between the UE and the base station, which may increase the likelihood for successful communications between the UE and the base station. Further, in some implementations of the present disclosure, the UE or the base station, or both, may generate a set of orthogonal sequences based on an orthogonal matrix and a cell-specific base sequence. In some examples, the cell-specific base sequence may be associated with a low peak-to-average power ratio (PAPR) and, based on implementing the described techniques, the UE may transmit the payload using an orthogonal sequence such that the low PAPR of the cell-specific base sequence is preserved during transmission of the payload over a number of symbols.

Aspects of the disclosure are initially described in the context of wireless communications systems. Aspects of the disclosure are also described in the context of an orthogonal matrix, a base sequence, a mathematical operation, sets of independent indices, and a set of joint indices. Aspects of the disclosure are further illustrated by and described with reference to apparatus diagrams, system diagrams, and flowcharts that relate to orthogonal sequence generation for multi-bit payloads.

FIG. 1 illustrates an example of a wireless communications system 100 that supports orthogonal sequence generation for multi-bit payloads in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations of the present disclosure, the UE 115 may transmit a signal including a payload (e.g., a multi-bit payload) to a base station 105 using an orthogonal sequence. In some examples, the UE 115 may generate or be configured with a set of orthogonal sequences, which may be equivalently referred to as a set of orthogonal codepoints. In some aspects, the orthogonal sequences may be orthogonal in both time and frequency.

The number of orthogonal sequences in the set of orthogonal sequences may be based on a number of time periods, such as OFDM symbols, and a number of frequency tones, such as a number of subcarriers, that are allocated for transmitting the payload of the signal. For instance, the UE may determine a resource allocation of N OFDM symbols and M frequency tones and may accordingly determine N*M orthogonal sequences. The UE 115 may select a subset of the set of orthogonal sequences based on the size of the payload (e.g., the number of bits in the payload). For example, the UE 115 may identify that the payload includes a number of bits and may select a number of orthogonal sequences from the set of orthogonal sequences based on the number of bits. In some other examples, the base station 105 may similarly generate a set of orthogonal sequences and determine a subset of orthogonal sequences based on the number of bits in the payload. In some aspects, the UE 115 or the base station 105, or both, may construct a codebook including the subset of orthogonal sequences. In the case that the codebook is constructed by the base station 105, the base station 105 may signal the constructed codebook to the UE 115.

In some examples, the UE 115 may select an orthogonal sequence from the subset of orthogonal sequences based on a bit stream of the payload. For example, the UE 115 may determine that the payload is associated a bit stream (e.g., successive values of a number of bits) and may determine a value corresponding to the bit stream based on a mapping. The UE 115 may use the value to select an orthogonal sequence from the subset of orthogonal sequences based on the indices of the subset of orthogonal sequences in the constructed codebook. For instance, the UE 115 may select an orthogonal sequence from the constructed codebook based on identifying an index associated with each of the orthogonal sequences in the codebook and mapping (i.e., matching) the value determined based on the bit stream to an index in the codebook. As such, the UE 115 may select the orthogonal sequence associated with the index value that maps to the bit stream of the payload and, as such, may transmit the payload including the number of bits using the selected orthogonal sequence.

Figure 2:
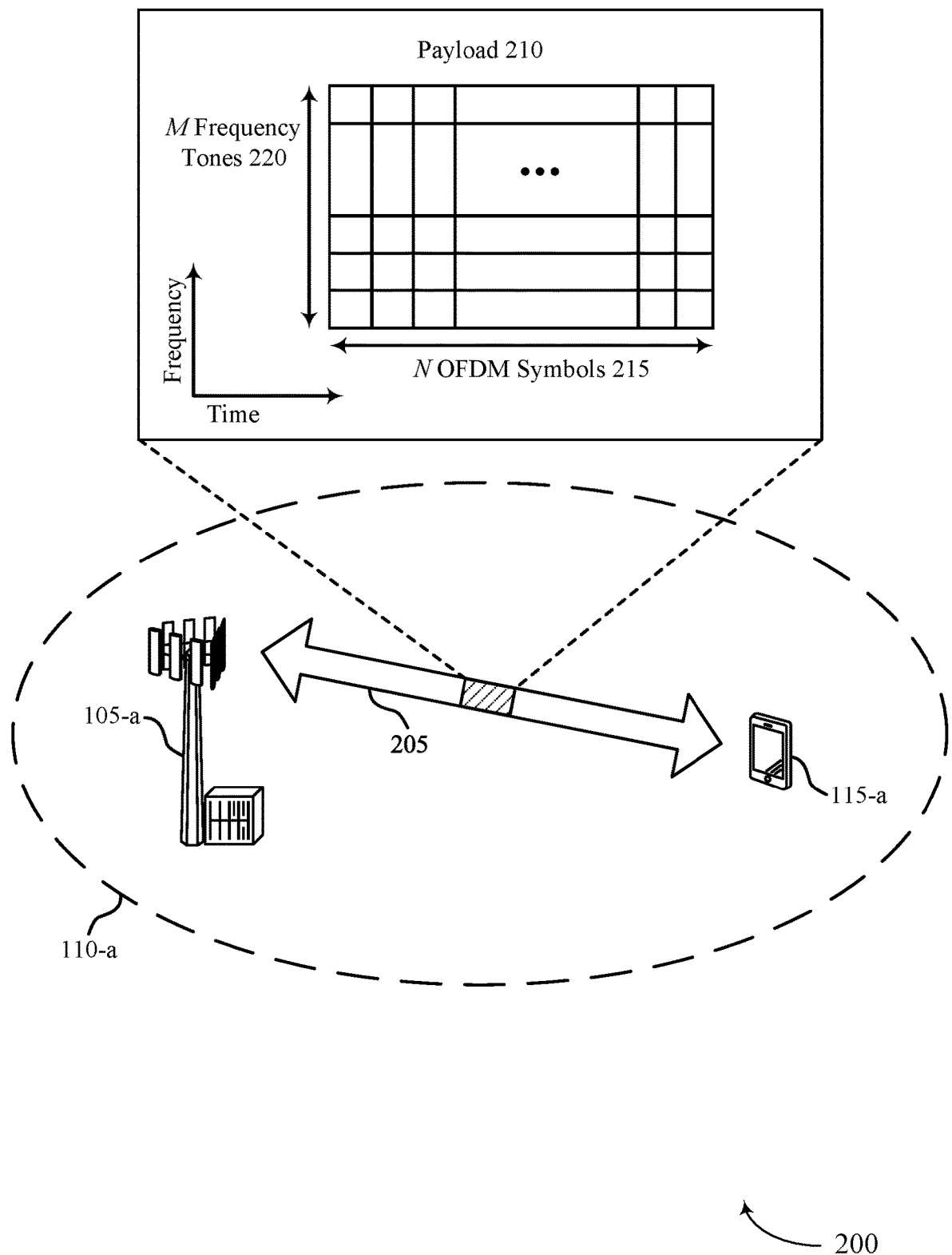
FIG. 2 illustrates an example of a wireless communications system that supports orthogonal sequence generation for multi-bit payloads in accordance with aspects of the present disclosure.

FIG. 2 illustrates an example of a wireless communications system 200 that supports orthogonal sequence generation for multi-bit payloads in accordance with aspects of the present disclosure. In some examples, the wireless communications system 200 may implement aspects of the wireless communications system 100. The wireless communications system 200 may include a UE 115-*a* and a base station 105-*a*, which may be examples of corresponding devices as described herein, including with reference to FIG. 1. The UE 115-*a* and the base station 105-*a* may communicate via a communication link 205 within a geographic coverage area 110-*a*. In some examples, the UE 115-*a* may transmit a signal including a payload 210 to the base station 105-*a* via the communication link 205. The payload 210 may occupy a resource allocation of N OFDM symbols 215 and M frequency tones 220 and the UE 115-*a* may convey the payload 210 using a sequence based on the N OFDM symbols 215 and the M frequency tones 220.

As described herein, N may correspond to any number, but may sometimes be defined within the range of 1 to 14. Similarly, M may correspond to any number, but may sometimes be defined within the range of 1 to 12. In some cases, such as when N=14 and M=12, the resource allocation may be a resource block. Further, as described herein, the payload 210 may be an example of any signal including information (e.g., a number of bits) and, although described in the context of transmission from the UE 115-*a*, may be transmitted by either the UE 115-*a* or the base station 105-*a*. In some examples, the payload 210 may be an example of uplink control information and, accordingly, the UE 115-*a* may transmit the payload 210 in a resource allocation of a physical uplink control channel (PUCCH). In such examples, the N OFDM symbols 215 and the M frequency tones 220 may correspond to a time and frequency resource grid assigned to the PUCCH for the UE 115-*a* to transmit the payload 210.

In some cases, the wireless communications system 200 may be associated with some latency and reliability conditions or constraints that support communications between the UE 115-*a* and the base station 105-*a*. For example, in some cases, the wireless communications system 200 may support communications between the UE 115-*a* and the base station 105-*a* based on maintaining low-latency and high-reliability transmissions between the UE 115-*a* and the base station 105-*a*. Such low-latency and high-reliability conditions may be further tightened for communications in relatively high-frequency radio frequency bands, such as communications over an FR2 radio frequency band (e.g., a mmW radio frequency band). In some cases, the UE 115-*a* may use a non-orthogonal sequence (or codepoint) to convey the payload 210. For example, the UE 115-*a* may generate or be configured with a codebook of non-orthogonal sequences and the UE 115-*a* may select a non-orthogonal sequence from the codebook to convey the payload 210. In some circumstances, however, such use of non-orthogonal sequences may fail to meet the latency or reliability constraints of the wireless communications system 200, which may decrease the likelihood for successful communications between the UE 115-*a* and the base station 105-*a*.

In some implementations of the present disclosure, the UE 115-*a* or the base station 105-*a*, or both, may generate or otherwise identify a set of orthogonal sequences from which the UE 115-*a* may select a sequence for conveying the payload 210. In some cases, such use of orthogonal sequences to convey the payload 210 may provide for low-latency and reliable communications with the base station 105-*a*. Accordingly, based on supporting orthogonal sequences for conveying a payload 210, the UE 115-*a* and the base station 105-*a* may experience an increase in the likelihood for successful communications between the UE 115-*a* and the base station 105-*a*.

In some examples, the UE 115-*a* or the base station 105-*a*, or both, may generate a number of orthogonal sequences based on the resources allocated for the payload 210. For example, the UE 115-*a* and the base station 105-*a* may communicate via a resource allocation of a communication channel and the UE 115-*a* or the base station 105-*a*, or both, may generate a number of orthogonal sequences based on the resource allocation. For instance, the base station 105-*a* may allocate N OFDM symbols 215 and M frequency tones 220 for transmission of the payload 210 and, accordingly, the UE 115-*a* or the base station 105-*a*, or both, may generate a number of orthogonal sequences equal to N*M. In some aspects, each orthogonal sequence of the set of orthogonal sequences may have a length equal to the size of the resource allocation (e.g., the number of resource elements in the resource allocation, or N*M), such that each orthogonal sequence may convey the payload 210 across the resource allocation. As such, the UE 115-*a* or the base station 105-*a*, or both, may generate a set of N*M orthogonal sequences and each orthogonal sequence may be associated with a length of N*M. The generation of the set of orthogonal sequences is described in more detail herein, including with reference to FIGS. 3A and 3B.

The UE 115-*a* or the base station 105-*a*, or both, may determine a subset of the set of orthogonal sequences based on the payload 210. For example, the UE 115-*a* or the base station 105-*a*, or both, may determine a size of the payload 210 (e.g., a number of bits included in the payload 210) and may determine a subset of the set of orthogonal sequences based on the size of the payload 210. For instance, the payload 210 may include a number of bits equal to K and, accordingly, the number of orthogonal sequences within the determined subset of orthogonal sequences may be based on the value of K. In some implementations, for example, the UE 115-*a* or the base station 105-*a*, or both, may select a number of orthogonal sequences equal to $2^K$ based on identifying that the payload 210 includes K bits. In some cases, the UE 115-*a* or the base station 105-*a*, or both, may select $2^K$ orthogonal sequences because $2^K$ orthogonal sequences may provide one orthogonal sequence for each possible value (i.e., permutation) of K bits. Additional details of the selection of the subset of orthogonal sequences are described herein, including with reference to FIGS. 4 and 5.

As such, the UE 115-*a* or the base station 105-*a*, or both, may identify a subset of orthogonal sequences (e.g., a subset of $2^K$ orthogonal sequences) from which the UE 115-*a* may select an orthogonal sequence to convey the payload 210. In the case that the base station 105-*a* generates the set of orthogonal sequences and determines the subset of orthogonal sequences, the base station 105-*a* may signal an indication of the subset of orthogonal sequences to the UE 115-*a* and the UE 115-*a* may construct a codebook including the indicated subset of orthogonal sequences. Alternatively, in the case that the UE 115-*a*, or both the UE 115-*a* and the base station 105-*a*, generates the set of orthogonal sequences and selects the subset of orthogonal sequences from the set of orthogonal sequences, the UE 115-*a* may construct a codebook including the subset of orthogonal sequences without additional signaling from the base station 105-*a*. In some aspects, the UE 115-*a* may construct the codebook such that each orthogonal sequence of the subset of orthogonal sequences in the codebook is associated with an index in the codebook.

The UE 115-*a* may select an orthogonal sequence from the subset of orthogonal sequences (e.g., from the constructed codebook) to convey the payload 210 based on the bits in the payload 210. For example, the UE 115-*a* may identify a bit stream (e.g., successive values of a number of bits) of the payload 210 and may select an orthogonal sequence from the codebook based on the bit stream. The bit stream may be represented as $b_0, b_1, b_2, \ldots, b_{K-1}$, where b corresponds to a value of a bit and K is equal to the number of bits in the payload 210. In some implementations, the UE 115-*a* may convert the bit stream to a number (e.g., a decimal number), such as k, that may correspond to an orthogonal sequence of the subset of orthogonal sequences. For example, k may correspond to or map to an index in the codebook of the subset of orthogonal sequences. As such, the UE 115-*a* may convert the bit stream of the payload 210 into the value k and may determine which orthogonal sequence of the subset of orthogonal sequences corresponds to the index value of k (e.g., the UE 115-*a* may determine the $e^h$ sequence in the constructed codebook). Accordingly, the UE 115-*a* may select the orthogonal sequence corresponding to the index value of k and may transmit the payload 210 using the selected orthogonal sequence.

The UE 115-a, implementing the described techniques, may efficiently construct a codebook of orthogonal sequences and select one of the orthogonal sequences to convey the payload 210 based on the number of bits in the payload 210, which may increase the likelihood that the base station 105-a is able to successfully receive the payload 210 while avoiding unnecessary storage costs associated with storing the full set of generated orthogonal sequences. Moreover, the described techniques may support and maintain a low PAPR associated with the transmission of the payload 210, which may enable to the UE 115-a to more use a greater transmit power for transmitting the payload 210.

Although described in the context of communication between a base station 105-a and a UE 115-a, similar operations and techniques may apply for communication between two UEs 115-a. For example, a first UE 115-a may generate the codebook and select an orthogonal sequence from the codebook to convey a payload, as described herein, and may transmit the payload to a second UE 115-a on a sidelink channel. In such examples, the first UE 115-a may receive signaling related to generating the set of orthogonal sequences and the codebook from the base station 105-a or from the second UE 115-a. In examples in which the first UE 115-a receives the signaling from the second UE 115-a, the signaling may originate from the second UE 115-a or the second UE 115-a may act as a relay node between the base station 105-a and the first UE 115-a.

Further, although described herein as being performed by the UE 115-a, similar operations and techniques may be performed by the base station 105-a. For example, the base station 105-a may select an orthogonal sequence from the subset of orthogonal sequences to convey the payload 210 based on the bits in the payload 210 using a similar technique as that which is described as being done by the UE 115-a. The base station 105-a may transmit the payload using the selected orthogonal sequence, which may increase the likelihood that the UE 115-a (e.g., in the case of transmission of the payload 210 on a downlink channel) or another base station 105-a (e.g., in the case of transmission of the payload over a sidelink channel or via a wireless backhaul connection) is able to successfully receive the payload 210 while avoiding unnecessary storage costs associated with storing the full set of generated orthogonal sequences. In some examples, the base station 105-a may receive signaling related to generating the set of orthogonal sequences and the codebook from the UE 115-a, another base station 105-a, or may determine the set of orthogonal sequences and the codebook without receiving signaling from another device. Moreover, the base station 105-a, based on implementing the described techniques, may maintain a low PAPR associated with the transmission of the payload 210, which may enable to the base station 105-a to use a greater transmit power when transmitting the payload 210.

FIG. 3A illustrates examples of an orthogonal matrix 300 and a base sequence 301 that support orthogonal sequence generation for multi-bit payloads in accordance with aspects of the present disclosure. In some examples, the orthogonal matrix 300 and the base sequence 301 may be implemented to realize aspects of the wireless communications system 100 or the wireless communications system 200. For example, a UE 115 or a base station 105, or both, may use the orthogonal matrix 300 and the base sequence 301 to generate a set of orthogonal sequences from which the UE 115 may select an orthogonal sequence to convey a payload to the base station 105. The UE 115 and the base station 105 may be examples of corresponding devices as described herein, including with reference to FIGS. 1 and 2.

The orthogonal matrix 300, which may be referred to as W, may be an orthogonal, square matrix of size N (i.e., an N×N matrix). In some implementations, N may be equal to the number of symbols of a resource allocation associated with transmission of the payload, as described in more detail with reference to FIG. 2. Further, in some specific examples, the orthogonal matrix 300 may be a DFT matrix and, as such, may be equivalently referred to as a DFT matrix. Accordingly, a row or a column of the orthogonal matrix 300 (e.g., a vector) may be referred to as either $\vec{w}(n)$ or $\overrightarrow{DFT}(n)$, where n is an index of the row or the column of the orthogonal matrix 300 (e.g., the $n^{th}$ row or column). Although FIG. 3A illustrates n=1, n may be equal to any number n=0, 1, 2, . . . , N−1. A row of the orthogonal matrix 300 is defined by Equation 1, shown below.

$$\overrightarrow{DFT}(n)=[\omega^{0n},\omega^{1n},\omega^{2n},\ldots\omega^{in},\ldots,\omega^{(N-1)n}] \quad (1)$$

The corresponding column of the orthogonal matrix 300 may be equal to $\overrightarrow{DFT}(n)^T$. In Equation 1, ω may be defined as either $\omega=e^{-j2\pi/N}$ or $\omega=e^{j2\pi/N}$. Each column of the vector $\overrightarrow{DFT}(n)$ (or each row of the vector $\overrightarrow{DFT}(n)^T$) may correspond to an OFDM symbol index i, where i=0 in the first column (i.e., the left-most column) of the orthogonal matrix 300 and increments by one to i=N−1 in the last column (i.e., the right-most column) of the orthogonal matrix 300. In some cases, an OFDM symbol index i may correspond to an OFDM symbol of the resource allocation that the UE 115 may use to transmit the payload. In some cases, the phase ramp of a row or a column of the orthogonal matrix 300 may be defined as i*n, where i is the OFDM symbol index and n may describe the slope of the phase change. As such, a column or a row of the orthogonal matrix 300 may include entries for each OFDM symbol of the resource allocation in one frequency tone.

The base sequence 301, which may be equivalently referred to as a base sequence $\vec{S}(m)$, may be a cyclically shifted frequency-domain base sequence. In other words, the base sequence 301 may be a frequency-domain base sequence S associated with a cyclic shift in the time-domain. As such, the base sequence S may be based on a cyclic shift index m, where m=0, 1, 2, . . . , M−1. In some aspects, M may be equal to the number of frequency tones of a resource allocation associated with the transmission of the payload, as described in more detail with reference to FIG. 2. Equivalently, the base sequence S may be associated with a phase ramp vector in the frequency domain, such as $e^{-j2\pi lm/M}$ or $e^{j2\pi lm/M}$, and the phase ramp vector and the base sequence S may be multiplied together to determine the base sequence $\vec{S}(m)$, as shown by base sequence 301.

For example, the UE 115 or the base station 105, or both, may take a DFT or a fast Fourier transform (FFT) of the base sequence S in the frequency-domain to convert the base sequence S to the time-domain, where the time-domain representation of the base sequence S, which may be referred to as $\tilde{S}$, has a length M. The UE 115 or the base station 105, or both, may apply a cyclic shift index m to $\tilde{S}$ to shift $\tilde{S}$ by index m, which may effectively move the entries of $\tilde{S}$ forward or backward by m in a cyclic fashion. The time-domain cyclic shift may correspond to the frequency-domain phase ramp vector $e^{-j2\pi lm/M}$ or $e^{j2\pi lm/M}$. The index m of the phase ramp may correspond to a slope of the phase ramp (e.g., the phase ramp may be defined as m/M) and the index l may correspond to a tone index of the resource allocation. As shown in base sequence 301, S(0), S(1), S(2), ..., S(l), ..., S(M−1) may correspond to entries of the base sequence S for each frequency tone l=0, 1, 2, ..., M−1. Accordingly, the base sequence 301 may include entries for each frequency tone of the resource allocation in one OFDM symbol.

In some cases, the base sequence 301 may be a cell-specific base sequence, such that each UE 115 within a cell of the base station 105 (e.g., within a geographic coverage area of the base station 105) may use the same base sequence 301. Further, in some cases, the base sequence 301 may have a low PAPR property and may be referred to as a low PAPR sequence. In some cases, a cyclic shift in the time-domain and a phase ramp in the frequency domain may avoid affecting the PAPR of the base sequence, thus maintaining the PAPR associated with the base sequence 301.

As illustrated in FIG. 3A, the base sequence 301 may be a vector of size M×1. Additionally, there may be a number of base sequences 301 equal to the number of cyclic shift indices associated with the base sequence 301. For instance, there may be M base sequences 301 (i.e., one base sequence $\vec{S}(m)$ for each of m=0, 1, 2, ..., M−1). Further, each row of the base sequence 301 may correspond to a frequency tone index l, where l=0 in the first row (i.e., the bottom row) and increments by one to l=M−1 in the last column (i.e., the top row). As such, each frequency tone index l may correspond to a frequency tone of the resource allocation associated with the transmission of the payload. Accordingly, a number of base sequences 301 (e.g., a number equal to M) may be considered, and the number of base sequences 301 may be visualized as a matrix of base sequences $\vec{S}(m)$ of dimensions M×M (e.g., M cyclic shifts×M frequency tones).

As described herein, the UE 115 or the base station 105, or both, may generate a set of orthogonal sequences. In some examples, the UE 115 or the base station 105, or both, may generate a number of orthogonal sequences based on a product, such as a Kronecker product, of the orthogonal matrix 300 and each of the number of base sequences 301. The Kronecker product of the orthogonal matrix 300 and each of the number of base sequences 301 may involve determining the Kronecker product of each row or column n of the orthogonal matrix 300 and each cyclic shift index m of the base sequence 301, and repeating the operation for all permutations of n and m, where n=0, 1, ..., N−1 and m=0, 1, ..., M−1.

As such, the number of orthogonal sequences in the set may be equal to the product of the dimensions of the orthogonal matrix 300 and a matrix representation of the base sequences 301. For instance, the orthogonal matrix 300 may be a matrix of size N×N and the base sequences 301 may be represented by a matrix of size M×M and, therefore, the Kronecker product between the two may result in an (N*M)×(N*M) matrix (e.g., an orthogonal (N*M)×(N*M) matrix). In other words, the UE 115 or the base station 105, or both, may generate a number of orthogonal sequences equal to N*M and each orthogonal sequence may have a length of N*M. As such, each orthogonal sequence may have a length equal to the number of resource elements (e.g., the number of OFDM symbol×frequency tone resource elements) included in the resource grid that is allocated to the UE 115 for transmission of the payload. Further, based on using a Kronecker product of the orthogonal matrix 300 and the base sequence 301, the signal transmitted on each OFDM symbol may have the same PAPR as the base sequence 301, which may improve the coverage area of the UE 115 because the UE 115 may drive a power amplifier to a set power ratio and use a maximum or upper limit transmit power of the UE 115 to transmit the signal. The generation of an individual orthogonal sequence using a Kronecker product is illustrated by and described in more detail with reference to FIG. 3B.

Figure 3B:
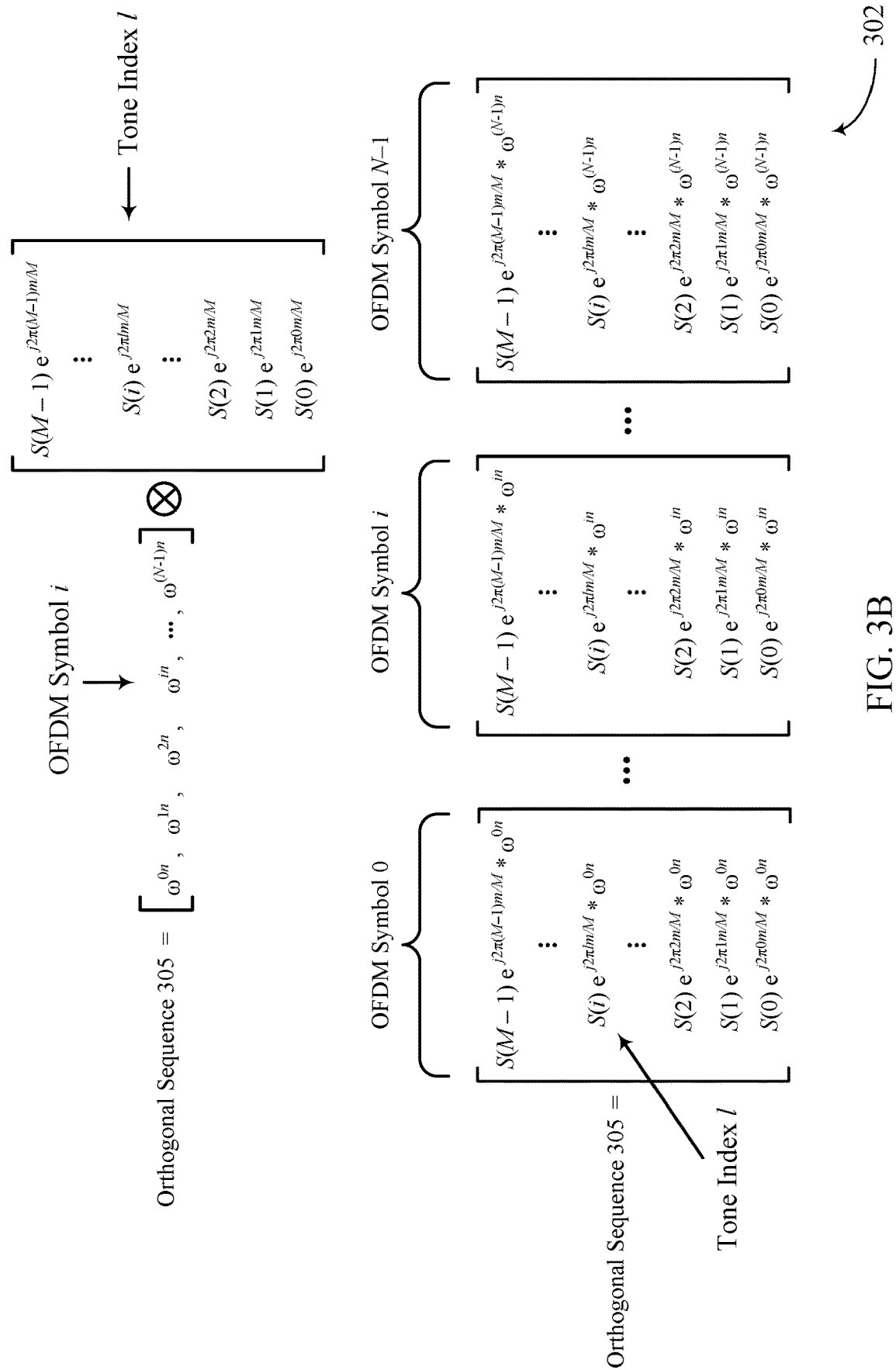
FIG. 3B illustrates an example of a mathematical operation that supports orthogonal sequence generation for multi-bit payloads in accordance with aspects of the present disclosure.

FIG. 3B illustrates an example of a mathematical operation 302 that supports orthogonal sequence generation for multi-bit payloads in accordance with aspects of the present disclosure. The mathematical operation 302 may be an example of a Kronecker product of a row or a column (e.g., a vector) of the orthogonal matrix 300 and a base sequence 301. In some examples, a UE 115 or a base station 105, or both, which may be examples of corresponding devices as described herein, may perform the mathematical operation 302 to determine an orthogonal sequence 305 (e.g., a sequence that is orthogonal in time and frequency). The UE 115 or the base station 105, or both, may determine the orthogonal sequence 305 when generating the set of orthogonal sequences (e.g., the N*M orthogonal sequences), as described in more detail with reference to FIG. 3A. For example, the mathematical operation 302 may illustrate a step or an operation of the generation of the set of orthogonal sequences and, as such, the mathematical operation 302 may be similarly performed for each unique pair of row or column index n of the orthogonal matrix 300 and cyclic shift index m of the base sequence 301. For instance, the UE 115 or the base station 105, or both, may perform the mathematical operation 302 N*M times (e.g., to generate N*M orthogonal sequences 305).

The UE 115 or the base station 105, or both, may determine a row or a column index n of the orthogonal matrix 300 from the N−1 row and column indices of the orthogonal matrix 300 and a cyclic shift index m of the base sequence 301 from the M−1 cyclic shift indices of the base sequence 301. In other words, the UE 115 or the base station 105, or both, may determine the vector corresponding to the row or the column index n of the orthogonal matrix 300, which may be referred to as $\overrightarrow{DFT}(n)$ and be defined by Equation 1, and the vector corresponding to the cyclic shift index m of base sequence 301, which may be illustrated by base sequence $\vec{S}(m)$ (e.g., base sequence 301 may illustrate $\vec{S}$ (cyclic index=m)).

The UE 115 or the base station 105, or both, may determine the Kronecker product of $\overrightarrow{DFT}(n)$ and $\vec{S}(m)$ to determine the orthogonal sequence 305. The Kronecker product is defined such that the base sequence $\vec{S}(m)$ is multiplied by each column of $\overrightarrow{DFT}(n)$ if $\overrightarrow{DFT}(n)$ is a row vector or by each row of $\overrightarrow{DFT}(n)$ if $\overrightarrow{DFT}(n)$ is a column vector. For instance, the Kronecker product of $\overrightarrow{DFT}(n)$ and $\vec{S}(m)$ may be defined by Equation 2, shown below and in expanded form in FIG. 3B.

$$\overrightarrow{DFT}(n) \otimes \vec{S}(m) = [\omega^{0n} * \vec{S}(m), \omega^{1n} * \vec{S}(m), \quad (2)$$
$$\omega^{2n} * \vec{S}(m), \ldots \omega^{in} * \vec{S}(m), \ldots, \omega^{(N-1)n} * \vec{S}(m)]$$

In some implementations, such as when $\overrightarrow{DFT}(n)$ and $\vec{S}(m)$ are either both row vectors or both column vectors, Equation 2 may generate a (N*M)×1 orthogonal sequence 305 (in the case that $\overrightarrow{DFT}(n)$ and $\vec{S}(m)$ are column vectors) or an 1×(N*M) orthogonal sequence 305 (in the case that $\overrightarrow{DFT}(n)$ and $\vec{S}(m)$ are row vectors). Alternatively, in some other implementations, $\overline{DFT}(n)$ may be a row vector and $\vec{s}(m)$ may be a column vector. In such implementations, Equation 2 may generate an orthogonal sequence of dimensions N×M. In such implementations, the UE 115 or the base station 105, or both, may concatenate each column below the lowest entry of the previous column to effectively generate a (N*M)×1 orthogonal sequence 305. The UE 115 or the base station 105, or both, may perform such concatenation so that the orthogonal sequence 305 is represented as a column (or a row) and may be indexed in a codebook. In either implementation, each entry in the orthogonal sequence 305 may be associated with a unique (i, l) pair, where i may correspond to an OFDM symbol index of the N OFDM symbols of the resource allocation and l may correspond to a frequency tone index of the M frequency tones in the resource allocation. Accordingly, regardless of the specific implementation, the UE 115 or the base station 105 may map the generated orthogonal sequence 305 to the allocated resource grid such that an entry of the orthogonal sequence 305 corresponding to a unique (i, l) pair maps to a resource element of the resource grid associated with the (i, l) pair (e.g., the resource element at the $i^{th}$ OFDM symbol and the $l^{th}$ frequency tone of the resource grid).

In some examples, an OFDM symbol index i=0 may correspond to the first OFDM symbol (e.g., the temporally earliest) of the resource allocation and a frequency tone index i=0 may correspond to the lowest frequency tone (e.g., the lowest frequency subcarrier) of the resource allocation. Likewise, an OFDM symbol index i=N−1 may correspond to the last (e.g., the temporally latest) OFDM symbol of the resource allocation and a frequency tone index i=M−1 may correspond to the highest frequency tone (e.g., the highest frequency subcarrier) of the resource allocation.

Such generation of a set of orthogonal sequences 305 may be correspond a spreading of the base sequence 301 in the time-domain (e.g., based on a CDMA concept) via the orthogonal matrix 300 (e.g., using a DFT vector in the time-domain) and a phase ramping in the frequency-domain based on the cyclic shift index of the base sequence 301. As described with reference to FIG. 2, the phase ramping in the frequency-domain may correspond to (e.g., be equivalent to) a cyclic shift in the time-domain. In the case that the orthogonal matrix is a DFT matrix, the described techniques may also correspond to a DFT-based orthogonal cover code and cyclic shift-based multiplexing representation of the payload for a single user. Further, the implementations of the present disclosure may correspond to an index modulation scheme using N DFT dimensions and M cyclic shift dimensions to carry a number of bits based on the N and M dimensions. For instance, such an index modulation scheme may carry the payload based on an on-off pattern on the N*M tones of the orthogonal sequence 305. When using index modulation, the UE 115 may convey different information by using different on-off patterns on the N*M tones of the orthogonal sequence 305. In some examples, the described techniques may be implemented to carry $\log_2$ (N*M) bits based on having N DFT dimensions and M cyclic shift dimensions (e.g., an orthogonal sequence 305 of length N*M generated by the orthogonal matrix 300 and the base sequence 301 may carry $\log_2$ (N*M) bits).

As such, the UE 115 or the base station 105, or both, may determine the orthogonal sequence 305 that may convey a payload across the resources allocated for the transmission of the payload. The UE 115 or the base station 105, or both may repeat the mathematical operation 302 for each unique pair of row or column index n of the orthogonal matrix 300 and each cyclic shift index m of the base sequence 301 (i.e., each unique (n, m) pair) to generate N*M orthogonal sequences 305, where each of the N*M orthogonal sequences 305 may convey the payload across each resource element in the resource grid defined by N OFDM symbols and M frequency tones. In some implementations, the UE 115 or the base station 105, or both, may construct a codebook of a subset of the N*M orthogonal sequences 305 based on the number of bits in the payload. The selection of the subset of orthogonal sequences is described in further detail with reference to FIGS. 4 and 5.

Figure 4:
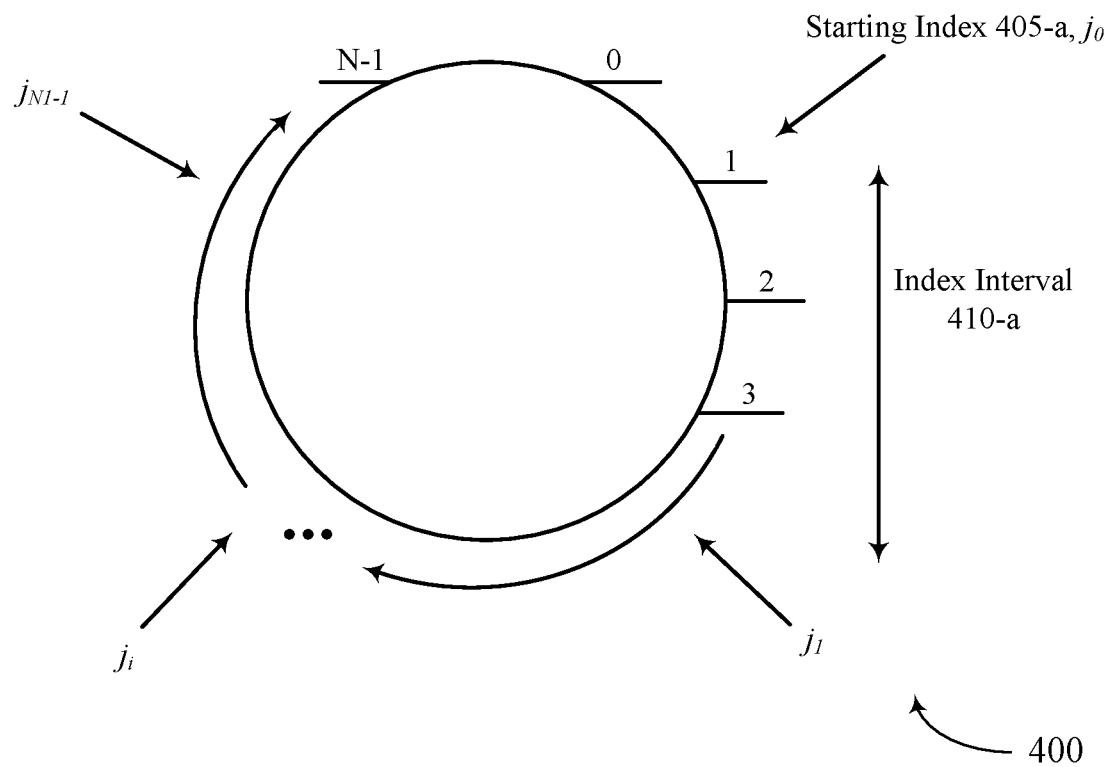
FIG. 4 illustrates examples of sets of indices that support orthogonal sequence generation for multi-bit payloads in accordance with aspects of the present disclosure.
Figure 4:
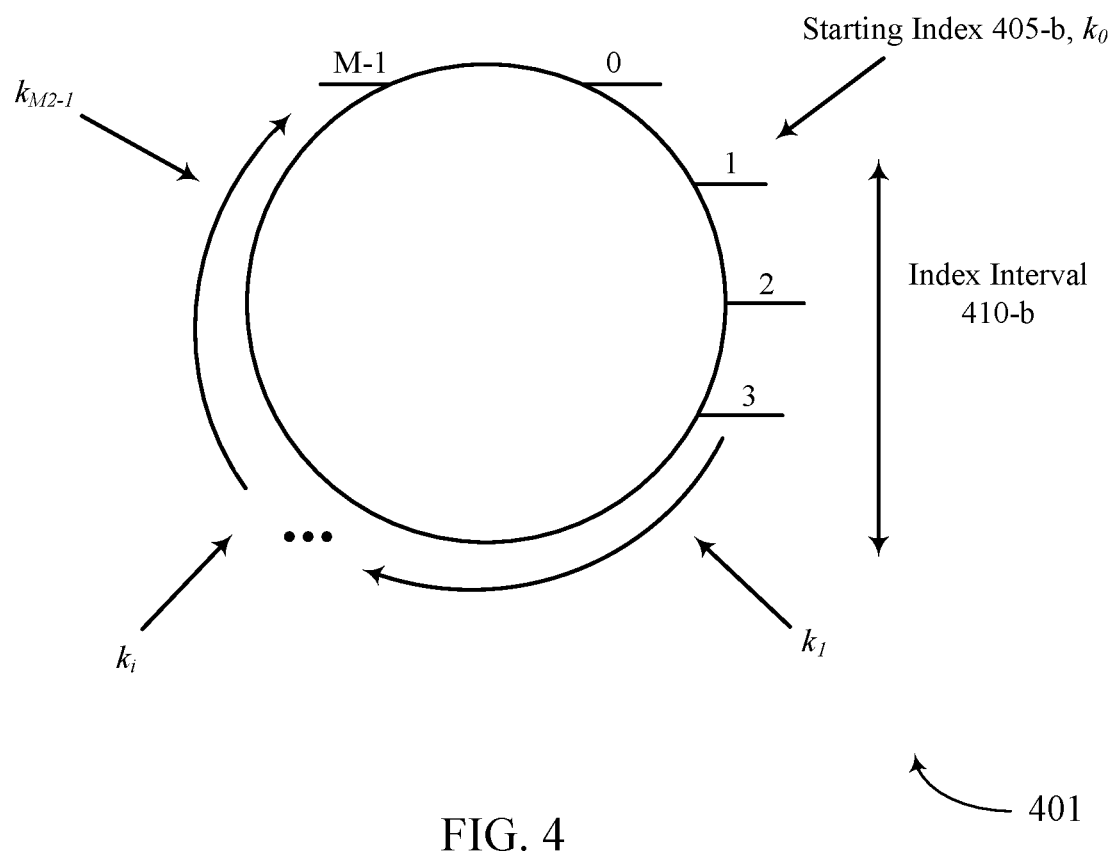

FIG. 4 illustrates examples of sets of indices 400 and 401 that support orthogonal sequence generation for multi-bit payloads in accordance with aspects of the present disclosure. In some examples, the set of indices 400 may correspond to a circular visualization of the row or column indices n=0, 1, 2, . . . , N−1 of the orthogonal matrix and the set of indices 401 may correspond to a circular visualization of the cyclic shift indices m=0, 1, 2, . . . , M−1 of the base sequence. The UE 115 or the base station 105, or both, which may be examples of corresponding devices as described herein, may employ the circular visualization of the N row or column indices of the orthogonal matrix and the M cyclic shift indices of the base sequence to determine the subset of orthogonal sequences to include in a codebook. For example, the UE 115 or the base station 105, or both, may determine that the size of the payload is K bits and may select a number of orthogonal sequences (e.g., $2^K$ orthogonal sequences) from the generated N*M orthogonal sequences based on the sets of indices 400 and 401.

As described herein, the UE 115 or the base station 105, or both, may determine that the payload includes K bits and may determine that the size of the codebook including the subset of orthogonal sequences is $2^K$ (e.g., the codebook may include $2^K$ orthogonal sequences) based on the K bits in the payload. In some implementations, the UE 115 or the base station 105, or both, may select the subset of orthogonal sequences by determining two values, K1 and K2, where K1+K2=K. In some aspects, the base station 105 may determine the values K1 and K2 and may signal the values to the UE 115. As such, the UE 115 may determine the values K1 and K2 based on receiving the signaling from the base station 105.

The UE 115 may determine a number of indices N1 and a number of indices M2 based on the values of K1 and K2, where N1 may correspond to a number of the N row or column indices of the orthogonal matrix (e.g., N1 indices in the DFT domain) and M2 may correspond to a number of the M cyclic shift indices of the base sequence (e.g., M2 indices in the cyclic shift domain). In some implementations, the UE 115 may determine that N1=$_2$K1 and that M2=$2^{K2}$, where N1≤N and M2≤M. As such, the UE 115 may determine values for N1 and M2 based on the values K1 and K2 and, in some examples, may select the subset of orthogonal sequences based on N1 and M2.

For example, the UE 115 may select N1 row or column indices from the n=0, 1, 2, . . . , N−1 row or column indices of the orthogonal matrix and M2 cyclic shift indices of the m=0, 1, 2, . . . , M−1 cyclic shift indices of the base sequence. In some implementations, the UE 115 may select the N1 row or column indices of the orthogonal matrix based on maintaining a largest possible gap between the selected indices (e.g., a largest possible gap based on the circular visualization of the N indices in the set of indices 400). As such, the UE 115 may mitigate the influence of channel doppler shift on the transmission of the payload. Similarly, the UE 115 may select the M2 cyclic shift indices of the base sequence based on maintaining a largest possible gap between the selected indices (e.g., a largest possible gap based on the circular visualization of the M indices in the set of indices 401). As such, the UE 115 may mitigate the influence of channel delay spread on the transmission of the payload.

In some examples, the UE 115 may determine the indices (e.g., the values of n and m) associated with the subset of orthogonal sequences based on the number of the indices N1 and M2, a starting index 405-a, a starting index 405-b, an index interval 410-a, and an index interval 410-b. The starting index 405-a may correspond to a starting row or column index $j_0$ of the orthogonal matrix that the UE 115 may use to determine one or more orthogonal sequences and as a starting reference point from which to determine the other N1−1 row or column indices of the orthogonal matrix that may be used to determine one or more additional orthogonal sequences. Similarly, the starting index 405-b may correspond to a starting cyclic shift index $k_0$ that the UE 115 may use to determine one or more orthogonal sequences and as a starting reference point from which to determine the other M2−1 cyclic shift indices of the base sequence that may be used to determine one or more additional orthogonal sequences. Although $j_0$ and $k_0$ may be shown to correspond to index values of $j_0$=1 and $k_0$=1 in FIG. 4, $j_0$ and $k_0$ may correspond to any index n=0, 1, 2, . . . , N−1 or m=0, 1, 2, . . . , M−1, respectively.

The index interval 410-a may refer to an interval or an offset between two nearest selected row or column indices of the orthogonal matrix. Similarly, the index interval 410-b may refer to an interval or an offset between two nearest selected cyclic shift indices of the base sequence. As such, the UE 115 may determine a second row or column index of the orthogonal matrix, such as $j_1$, based on the index interval 410-a and the starting index 405-a (e.g., based on adding the index interval 410-a to the starting index 405-a). Likewise, the UE 115 may determine an $i^{th}$ row or column index of the orthogonal matrix, such as $j_i$, based on progressively adding the index interval 410-a to the starting index 405-a or based on a mathematical operation, such as described by Equation 3, shown below.

$$j_i = j_0 + (i * j_{offset}) \quad (3)$$

The UE 115 may continue determining indices of the orthogonal matrix in this manner until the UE 115 identifies the N1 row or column indices of the orthogonal matrix (e.g., until the UE 115 identifies $j_{N1-1}$). The UE 115 may likewise perform a similar procedure to determine the M2 cyclic shift indices of the base sequence using the index interval 410-b and the starting index $k_0$. As illustrated in FIG. 4, the UE 115 may determine a second cyclic shift index $k_1$, an $i^{th}$ cyclic shift index $k_i$, and so on until the UE 115 determines M2 cyclic shift indices (e.g., until the UE 115 determines cyclic shift index $k_{m2-1}$).

In some implementations, the base station 105 may signal, to the UE 115, an indication of the starting index 405-a and the starting index 405-b. Additionally, in some examples, the base station 105 may signal, to the UE 115, an indication of the index interval 410-a and the index interval 410-b that the UE 115 may use to determine the N1 and M2 indices. In some aspects, the base station 105 may signal the values K1 and K2, the starting index 405-a, the starting index 405-b, the index interval 410-a, and the index interval 410-b via different fields of a same message. Additionally or alternatively, the UE 115 may determine or derive the index interval 410-a and the index interval 410-b based on determining the maximum possible distance between the selected indices.

For example, the UE 115 may determine the index interval 410-a based on dividing the total number of row or column indices N by the number of indices N1. For instance, the UE 115 may determine that N1=4 and the UE 115 may divide the number of row or column indices N by 4 to determine the maximum index interval 410-a (e.g., the maximum index spacing or offset) between 4 selected indices. Similarly, the UE 115 may determine the index interval 410-b based on dividing the total number of cyclic shift indices M by the number of indices M2. For instance, the UE 115 may determine that M2=4 and the UE 115 may divide the number of cyclic shift indices M by 4 to determine the maximum index interval 410-b between 4 selected indices. In some cases, however, N1 or M2, or both, may be unable to divide into N or M, respectively, evenly. In such cases, the UE 115 may employ a function (e.g., a rounding function or a rounding operation) to determine the index interval 410-a or the index interval 410-b. For example, the function may include a modulo function, a floor function, a ceiling function, or a combination thereof.

In examples in which N1 fails to divide evenly into N and N1=4, the UE 115 may determine the four selected row or column indices of the orthogonal matrix based on Equations 4, 5, and 6, shown below.

$$\{k, \mod(k + \text{floor}(N/N1), N), \quad (4)$$
$$\mod(K + \text{floor}(2N/N1), N), \mod(K + \text{floor}(3N/N1), N)\}$$

$$\{k, \mod(k + \text{ceil}(N/N1), N), \quad (5)$$
$$\mod(K + \text{ceil}(2N/N1), N), \mod(K + \text{ceil}(3N/N1), N)\}$$

$$\{k, \mod(k + \text{floor}(N/N1), N), \quad (6)$$
$$\mod(K + \text{ceil}(2N/N1), N), \mod(K + \text{floor}(3N/N1), N)\}$$

As described by Equations 4, 5, and 6, the four selected row or column indices of the orthogonal matrix may be notated by $\{k, k_1, k_2 k_3,\}$, where k corresponds to the starting index 405 in this example. The UE 115 or the base station 105, or both, may use similar equations to select indices from the base sequence. For example, in an example where M2=4, the UE 115 or the base station 105, or both, may select cyclic shift indices of the base sequence as described in Equations 4, 5, and 6 by replacing N with M and N1 with M2. Equations 4, 5, and 6 are shown to illustrate some implementations of the present disclosure (e.g., when N1=4), and the UE 115 may use different equations other than or in addition to Equations 4, 5, and 6 to determine the selected indices without exceeding the scope of the present disclosure.

The UE 115, upon determining the number of indices N1 and M2, the starting index 405-a, the starting index 405-b, the index interval 410-a, and the index interval 410-b, may have sufficient information to select N1 row or column indices of the orthogonal matrix and M2 cyclic shift indices of the base sequence. In some implementations, the UE 115 may determine the orthogonal sequences of the generated set of orthogonal sequences associated with the selected indices. For instance, the UE 115 may determine a number of orthogonal sequences corresponding to each combination or permutation of the N1 indices of the orthogonal matrix and the M2 indices of the base sequence. For example, the UE 115 may identify each orthogonal sequence of the set of orthogonal sequences that corresponds to a Kronecker product of at least one of the selected N1 row or column indices of the orthogonal matrix and at least one of the selected M2 cyclic shift indices of the base sequence. Accordingly, the UE 115 may determine $N1*M2=2^{K1}*2^{K2}=2^{K1+K2}=2K$ orthogonal sequences from the set of M*N orthogonal sequences.

The UE 115 may construct a codebook with each of the selected $2^K$ orthogonal sequences such that each of the selected orthogonal sequences is associated with an index in the codebook. In some implementations, the UE 115 may determine which orthogonal sequence to use to convey the payload based on converting a bit stream $b_0, b_1, b_2, \ldots, b_{K-1}$ into a decimal number and mapping the decimal number to an index of the codebook, as described in more detail with reference to FIG. 2.

The sets of indices 400 and 401 illustrate one technique of the present disclosure to determine the subset of orthogonal sequences from the set of M*N orthogonal sequences based on using two independent indices for each of the orthogonal matrix and the base sequence (e.g., the N1 indices in the DFT domain and M2 indices in the cyclic shift domain are independent of each other). Alternatively, the UE 115 may select the subset of orthogonal sequences based on using a set of joint indices that correspond to indices in each of the orthogonal matrix and the base sequence, as described in more detail with reference to FIG. 5.

Figure 5:
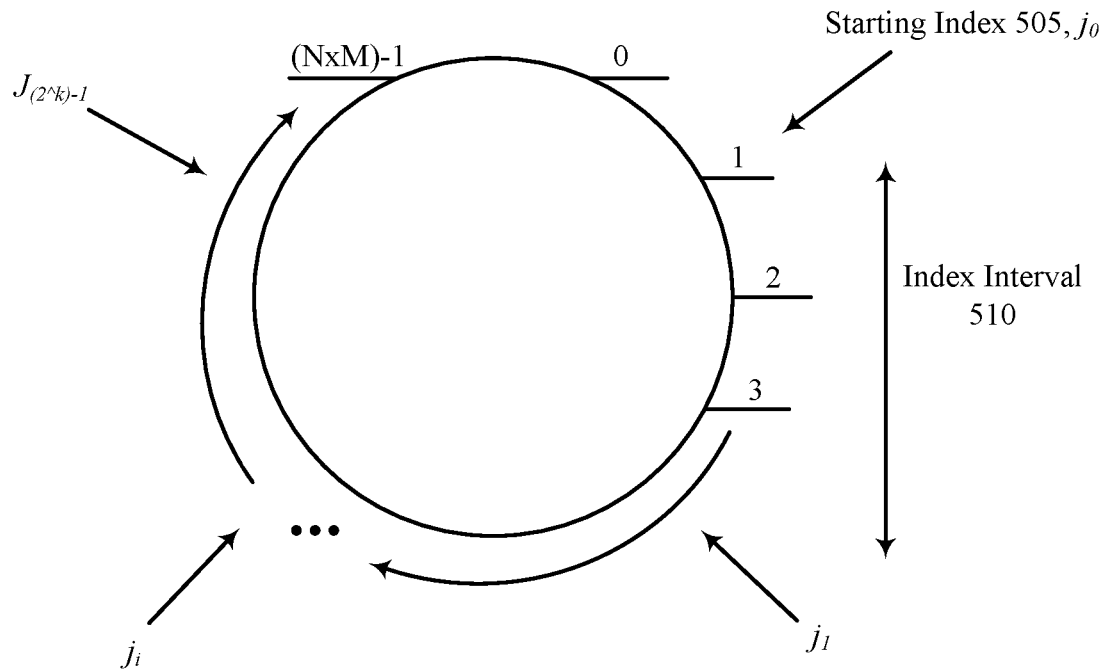
FIG. 5 illustrates an example of a set of indices that supports orthogonal sequence generation for multi-bit payloads in accordance with aspects of the present disclosure.

FIG. 5 illustrates an example of a set of indices 500 that supports orthogonal sequence generation for multi-bit payloads in accordance with aspects of the present disclosure. In some examples, the set of indices 500 may correspond to a circular visualization of a set of joint indices that correspond to indices of the orthogonal matrix and the base sequence. For example, the UE 115 or the base station 105, or both, may select the indices of the orthogonal matrix and the base sequence jointly. As described herein, the row and column indices of the orthogonal matrix may be defined as $n=0, 1, 2, \ldots, N-1$ and the cyclic shift indices of the base sequence may be defined as $m=0, 1, 2, \ldots, M-1$. In some examples, the set of joint indices j may be constructed based on the two separate indices n and m. For instance, in some specific examples, the UE 115 or the base station 105, or both, may determine a set of joint indices j, where $j=n*M+m$ or $j=m*N+n$. Accordingly, the set of joint indices may be defined as $j=0, 1, 2, \ldots, (N*M)-1$.

In some implementations, the UE 115 or the base station 105, or both, may select a subset of the indices $j=0, 1, 2, \ldots, (N*M)-1$ based on the number of bits in the payload. For example, if the payload includes K bits, the UE 115 or the base station 105, or both, may select a subset of the joint indices j. In some specific examples, the UE 115 or the base station 105, or both, may select $2^K$ indices of the set of joint indices j.

The UE 115 or the base station 105, or both, may select the subset of the set of joint indices (e.g., the $2^K$ join indices) from a starting index 505, such as $j_0$ and based on an index interval 510, which may refer to an index spacing or an offset between two nearest selected indices. In some examples, the base station 105 may signal an indication of the starting index 505 to the UE 115. Additionally, in some examples, the base station 105 may signal an indication of the index interval 510 to the UE 115. In such examples, the UE 115 may use the signaled starting index 505 and the signaled index interval 510 to select the subset of $2^K$ join indices.

Additionally or alternatively, the UE 115 may determine or derive the index interval 510 based on a function (e.g., a rounding function or operation). For instance, the UE 115 may determine the index interval 510, defined as $j_{offset}$, based on a floor function as described by Equation 7, shown below.

$$j_{offset} = \text{floor}(M*N/2^K) \quad (7)$$

The UE 115 may determine the index interval 510 based on Equation 7 and may determine the subset of $2^K$ join indices based on the signaled starting index 505 and the determined index interval 510. In some examples, the UE 115 may determine the subset of joint indices based on progressively adding and the index interval 510 to the starting index 505. For example, the UE 115 may determine the subset of joint indices based on Equation 8, shown below.

$$j_i = j_0 + (i * j_{offset}) \quad (8)$$

As shown in Equation 8, $j_i$ corresponds to an $i^{th}$ joint index j, $j_0$ is the starting index, $i=1, 2, 3, \ldots, 2^K-1$, and $j_{offset}$ is the index interval 510. As such, the UE 115 or the base station 105, or both, may determine a subset of joint indices including $j_0, j_1, \ldots, j_i, \ldots, j_{2_K-1}$, as shown in FIG. 5.

In some examples, each join index j may map to a pair of indices (n, m) (e.g., each joint index j may be constructed based on an index n and an index m), where n maps to OFDM symbols of the resource allocation and m maps to frequency tones of the resource allocation, depending on how the set of joint indices j is defined. For instance, in the case that $j=m*N+n$, the index j may map to (n, m) in a frequency first, time second manner. In other words, as j increments to successively higher integers, m may likewise increment to different integers until $m=0$ or $m=M-1$, at which point m is reset to $M-1$ or zero, respectively and n is incremented by one, and so on. In the case that $j=n*M+m$, the index j may map to (n, m) in a time first, frequency second manner. In other words, as j increments to successively higher integers, n may likewise increment to different integers until $n=N-1$, at which point n is reset to zero and m is incremented by one, and so on. As such, in either case, each value of joint index j may correspond to a unique (n, m) pair and the UE 115 or the base station 105, or both, may determine an orthogonal sequence corresponding to the Kronecker product of the row or column index n of the orthogonal matrix and the cyclic shift index m of the base sequence for each of the selected joint index j (e.g., for each of the selected $2^K$ join indices).

Accordingly, the UE 115 or the base station 105, or both, may determine a subset of orthogonal sequences based on the number of bits in the payload. As described herein, the UE 115 or the base station 105, or both, may construct a codebook including the subset of orthogonal sequences such that each orthogonal sequence is associated with an index in the constructed codebook. The UE 115 may select an orthogonal sequence from the constructed codebook of the subset of orthogonal sequences based on a bit stream $b_0, b_1, b_2, \ldots, b_{K-1}$ of the payload. For example, the UE 115 may convert the bit stream into a number or an index corresponding to an index in the constructed codebook. As such, the UE 115 may use the orthogonal sequence associated with the index corresponding to (i.e., matching) the number or index that was determined based on the bit stream to convey the payload across the allocated resources, as described in more detail with reference to FIG. 2.

Figure 6:
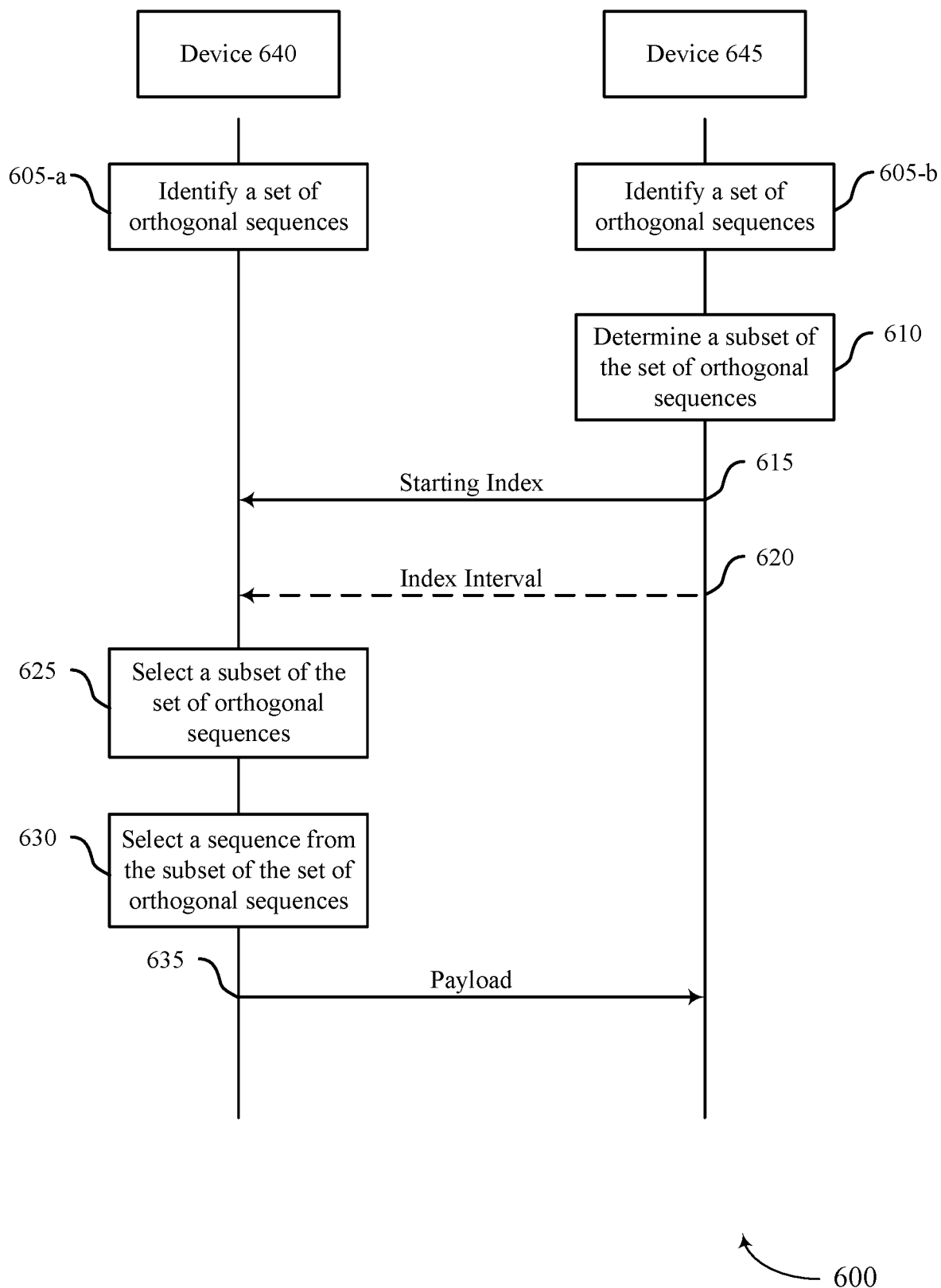
FIG. 6 illustrates an example of a process flow that supports orthogonal sequence generation for multi-bit payloads in accordance with aspects of the present disclosure.

FIG. 6 illustrates an example of a process flow 600 that supports orthogonal sequence generation for multi-bit payloads in accordance with aspects of the present disclosure. In some examples, the process flow 600 may implement aspects of the wireless communications system 100 or the wireless communications system 200. The process flow 600 may illustrate communication between a device 640 and a device 645, which may be examples of any wireless device as described herein. For example, the device 640 and the device 645 may be examples of a UE 115 or a base station 105 as described herein. The device 640 or the device 645, or both, may generate a set of orthogonal sequences and determine a subset of the orthogonal sequences from the set of orthogonal sequences. Further, the device 640 may select an orthogonal sequence from the subset of orthogonal sequences and transmit a payload to the device 645 using the selected orthogonal sequence. Alternative examples of the following may be implemented, where some steps are performed in a different order than described or are not performed at all. In some cases, steps may include additional features not mentioned below, or further steps may be added.

At 605-a, the device 640 may identify a set of orthogonal sequences for conveying a payload including a number of bits. In some examples, the device 640 may determine the number of orthogonal sequences in the set of orthogonal sequences based on the number of time periods (e.g., OFDM symbol periods) and a number of frequency tones (e.g., subcarriers) that the device 640 may use for conveying the payload. In some aspects, the number of time periods and frequency tones that the device 640 may use to convey the payload are part of a set of resources allocated to the device 640 by the device 645.

At 605-b, the device 645 may, in some implementations, similarly identify the set of orthogonal sequences for conveying the payload including the number of bits. In some examples, the device 645 may determine the number of orthogonal sequences in the set of orthogonal sequences is based on the number of time periods (e.g., OFDM symbol periods) and a number of frequency tones (e.g., subcarriers) that the device 640 may use for conveying the payload. In some aspects, the number of time periods and frequency tones that the device 640 may use to convey the payload are part of a set of resources allocated to the device 640 by the device 645.

As described herein, identifying the set of orthogonal sequences may include generating the set of orthogonal sequences based on a product of an orthogonal matrix having a size corresponding to the number of time periods and a cyclically shifted cell-specific sequence (e.g., a base sequence) having a length corresponding to the number of frequency tones. In some implementations, the orthogonal matrix may be a DFT matrix and the product may be a Kronecker product. Additional details of the identification or generation of the set of orthogonal sequences are described herein, including with reference to FIGS. 3A and 3B.

At 610, the device 645 may, in some implementations, determine a subset of the set of orthogonal sequences for conveying the payload. In some examples, the size of the subset of the set of orthogonal sequences is based on the number of bits in the payload. For example, the device 645 may identify that the payload includes K bits and may determine a number of orthogonal sequences from the set of orthogonal sequences based on K. In some implementations, the device 645 may determine a subset of $2^K$ orthogonal sequences. Additionally, in some examples, the device 645 may select the subset of the set of orthogonal sequences based on a pair of independent sets of indices corresponding to indices of the orthogonal matrix and the cyclically shifted cell-specific base sequence or based on a set of joint indices constructed based on the indices of the orthogonal matrix and the cyclically shifted cell-specific base sequence. The device 645 may select indices from the independent sets of indices or from the set of joint indices based on a starting index and an index interval (e.g., an index spacing or offset) that may be based on a maximum index interval between the selected indices. Additional details of the determination of the subset of the set of orthogonal sequences are described herein, including with reference to FIGS. 4 and 5.

At 615, the device 645 may signal an indication of at least one starting index to the device 640. In some examples, the device 645 may transmit an indication of a first starting index or an indication of a second starting index, or both, that the device 640 may use to identify two starting indices in the pair of independent sets of indices, as described in more detail herein, including with reference to FIG. 4. In some other examples, the device 645 may transmit an indication of a third starting index to the device 640 that the Device 640 may use to identify a starting index in the set of joint indices, as described in more detail herein, including with reference to FIG. 5.

At 620, the device 645 may optionally signal an indication of at least one index interval to the device 640. In some examples, the device 645 may transmit an indication of a first index interval or a second index interval, or both, that the device 640 may use to determine a number of indices of the orthogonal matrix or the cyclically shifted cell-specific sequence, or both, as described in more detail herein, including with reference to FIG. 4. In some other examples, the device 645 may transmit an indication of a third index interval to the device 640 that the device 640 may use to determine a number of indices of the set of joint indices, as described in more detail herein, including with reference to FIG. 5. In some implementations, the device 645 may refrain from transmitting an indication of an index interval to the device 640 and, in such implementations, the device 640 may determine the first index interval or the second index interval, or both, or determine the third index interval based on determining a maximum index interval, as also described in more detail with reference to FIG. 5. In some aspects, the signaling at 615 and at 620 may be included within a same message from the device 645 to the device 640.

At 625, the device 640 may select a subset of the set of orthogonal sequences for conveying the payload. In some examples, the size of the subset of the set of orthogonal sequences is based on the number of bits in the payload. For example, the device 640 may identify that the payload includes K bits and may determine a number of orthogonal sequences from the set of orthogonal sequences based on K. In some implementations, the device 640 may determine a subset of $2^K$ orthogonal sequences. The device 640 may select the subset of the set of orthogonal sequences based on the determined one or more starting indices and the determined one or more index intervals. In some examples, the device 640 may construct a codebook and include the subset of the set of orthogonal sequences in the constructed codebook. Additional details of the selection of the subset of the set of orthogonal sequences are described herein, including with reference to FIGS. 4 and 5.

At 630, the device 640 may select a sequence from the subset of the set of orthogonal sequences based on a mapping between the subset of the set of orthogonal sequences and the number of bits in the payload. In some examples, the device 640 may identify a bit stream of the payload and convert the bit stream into a decimal number corresponding to an index in the constructed codebook including the subset of the set of orthogonal sequences, where each sequence in the subset of the set of orthogonal sequences is associated with an index in the codebook. Accordingly, the device 640 may select the sequence that is associated with an index corresponding to the determined decimal number.

At 635, the device 640 may transmit the payload including the number of bits using the selected sequence. Likewise, the device 645 may receive the payload including the number of bits using the selected sequence from the subset of the set of orthogonal sequences. In examples in which the device 640 is an example of a UE and the device 645 is an example of a base station, the device 640 may transmit the payload to the device 645 on an uplink channel. In such examples, the payload may be an example of uplink control information. Alternatively, in examples in which the device 640 is an example of a base station and the device 645 is an example of a UE, the device 640 may transmit the payload to the device 645 on a downlink channel. In some other examples in which the device 640 and the device 645 are examples of either UEs or base stations, the device 640 may transmit the payload to the device 645 on a sidelink channel or via a wireless backhaul connection.

Figure 7:
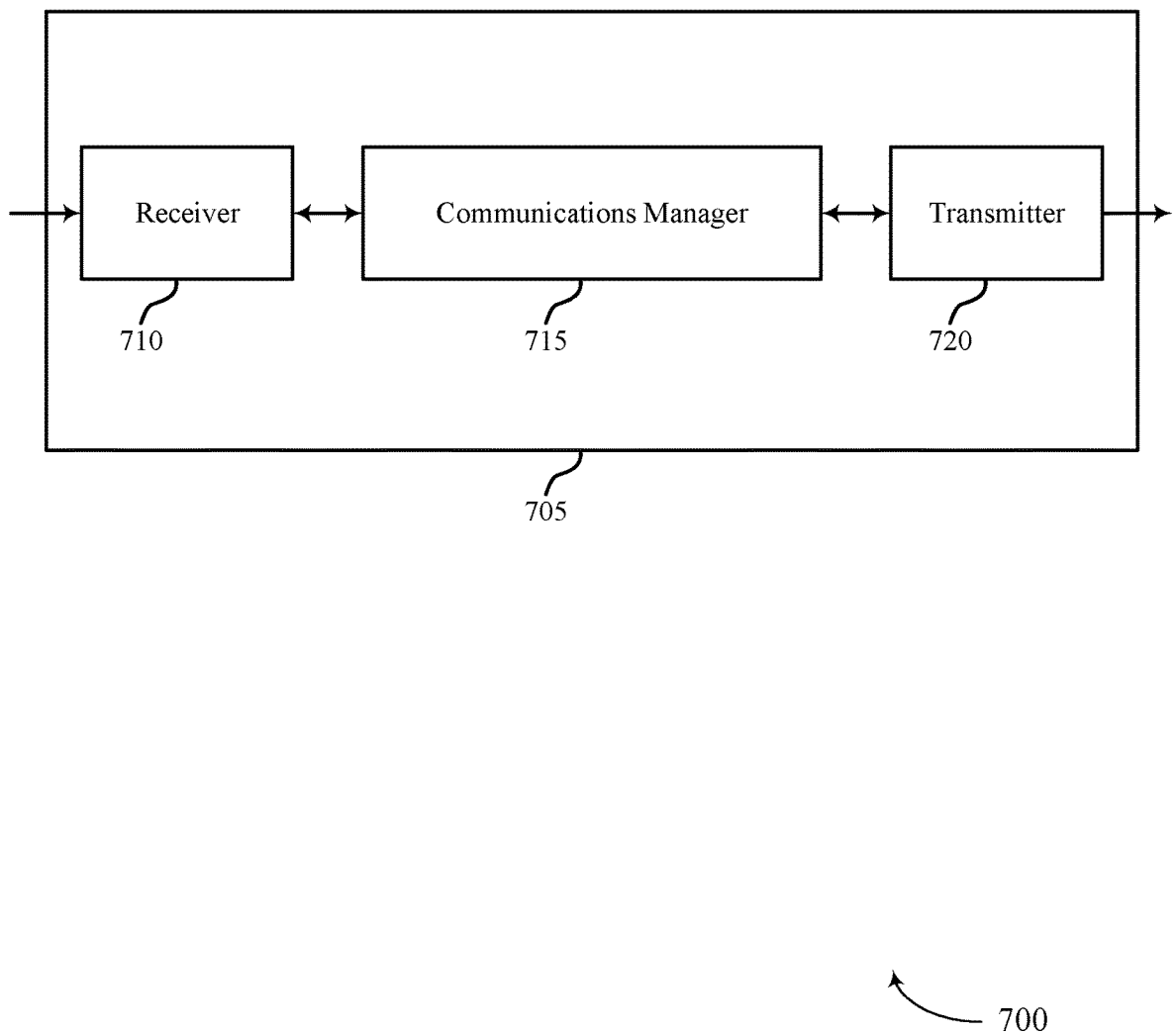
FIGS. 7 and 8 show block diagrams of devices that support orthogonal sequence generation for multi-bit payloads in accordance with aspects of the present disclosure.

FIG. 7 shows a block diagram 700 of a device 705 that supports orthogonal sequence generation for multi-bit payloads in accordance with aspects of the present disclosure. The device 705 may be an example of aspects of a UE 115 or a base station 105 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to orthogonal sequence generation for multi-bit payloads, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a set of orthogonal sequences for conveying a payload including a set of bits, where a number of the set of orthogonal sequences is based on a number of time periods for conveying the payload and a number of frequency tones for conveying the payload, select a sequence from the subset of the set of orthogonal sequences based on a mapping between the subset of the set of orthogonal sequences and the set of bits, select a subset of the set of orthogonal sequences for conveying the payload, where a size of the subset of the set of orthogonal sequences is based on a number of the set of bits, and transmit the payload including the set of bits using the selected sequence. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and the transmitter 720 may be implemented as analog components (e.g., amplifiers, filters, antennas) coupled with the mobile device modem to enable wireless transmission and reception over one or more bands.

The communications manager 715 may be implemented to realize one or more potential advantages. In some implementations, the communications manager 715 may construct a codebook of a subset of a set of generated sequences based on a Kronecker product of an orthogonal matrix and a cell-specific base sequence. As such, the communications manager 715 may generate a codebook of orthogonal sequences (e.g., sequences that are orthogonal in the time-domain and the frequency-domain). Further, the orthogonal sequences may maintain the low PAPR of the cell-specific base sequence, which may enable the device 705 to transmit a greater power and, likewise, improve its coverage area.

Moreover, based on constructing a codebook of a subset of the set of orthogonal sequences, the device 705 may avoid unnecessary storage costs associated with storing more sequences than necessary for the transmission of a K-sized payload. In some further examples, the use of an orthogonal sequence to convey a payload to a base station may reduce latency and increase reliability as compared to non-orthogonal sequences, which may increase the likelihood for successful communications between the device 705 and the base station. As such, one or more processing units of the device 705 may potentially spend less time re-transmitting a payload and, accordingly, may spend longer durations in a sleep mode. As such, the device 705 may experience improved power savings and increased battery life.

Figure 8:
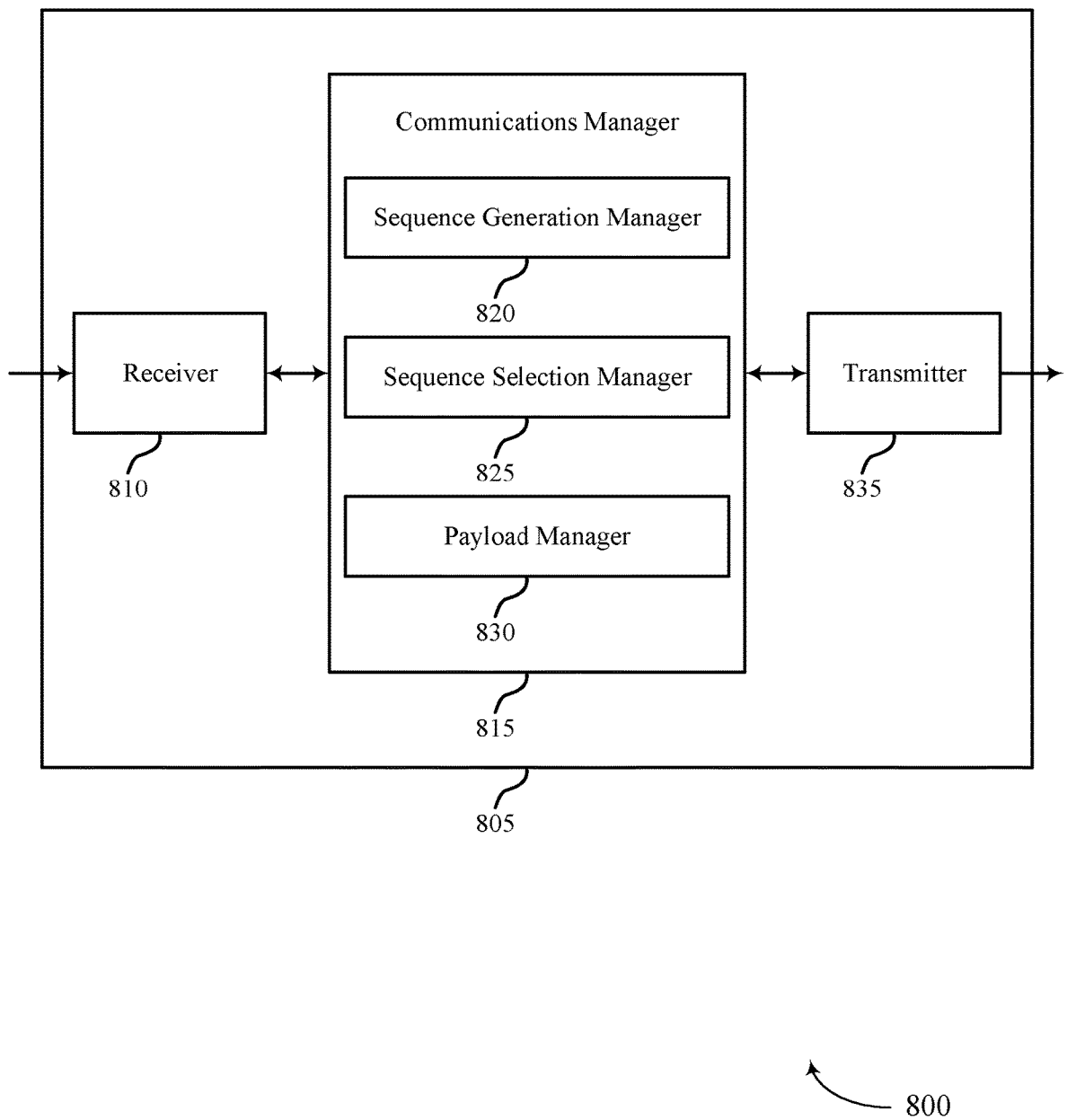

FIG. 8 shows a block diagram 800 of a device 805 that supports orthogonal sequence generation for multi-bit payloads in accordance with aspects of the present disclosure. The device 805 may be an example of aspects of a device 705, a UE 115, or a base station 105 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to orthogonal sequence generation for multi-bit payloads, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a sequence generation manager 820, a sequence selection manager 825, and a payload manager 830. The communications manager 815 may be an example of aspects of the communications manager 1010 described herein.

The sequence generation manager 820 may identify a set of orthogonal sequences for conveying a payload including a set of bits, where a number of the set of orthogonal sequences is based on a number of time periods for conveying the payload and a number of frequency tones for conveying the payload and select a sequence from the subset of the set of orthogonal sequences based on a mapping between the subset of the set of orthogonal sequences and the set of bits. The sequence selection manager 825 may select a subset of the set of orthogonal sequences for conveying the payload, where a size of the subset of the set of orthogonal sequences is based on a number of the set of bits. The payload manager 830 may transmit the payload including the set of bits using the selected sequence.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
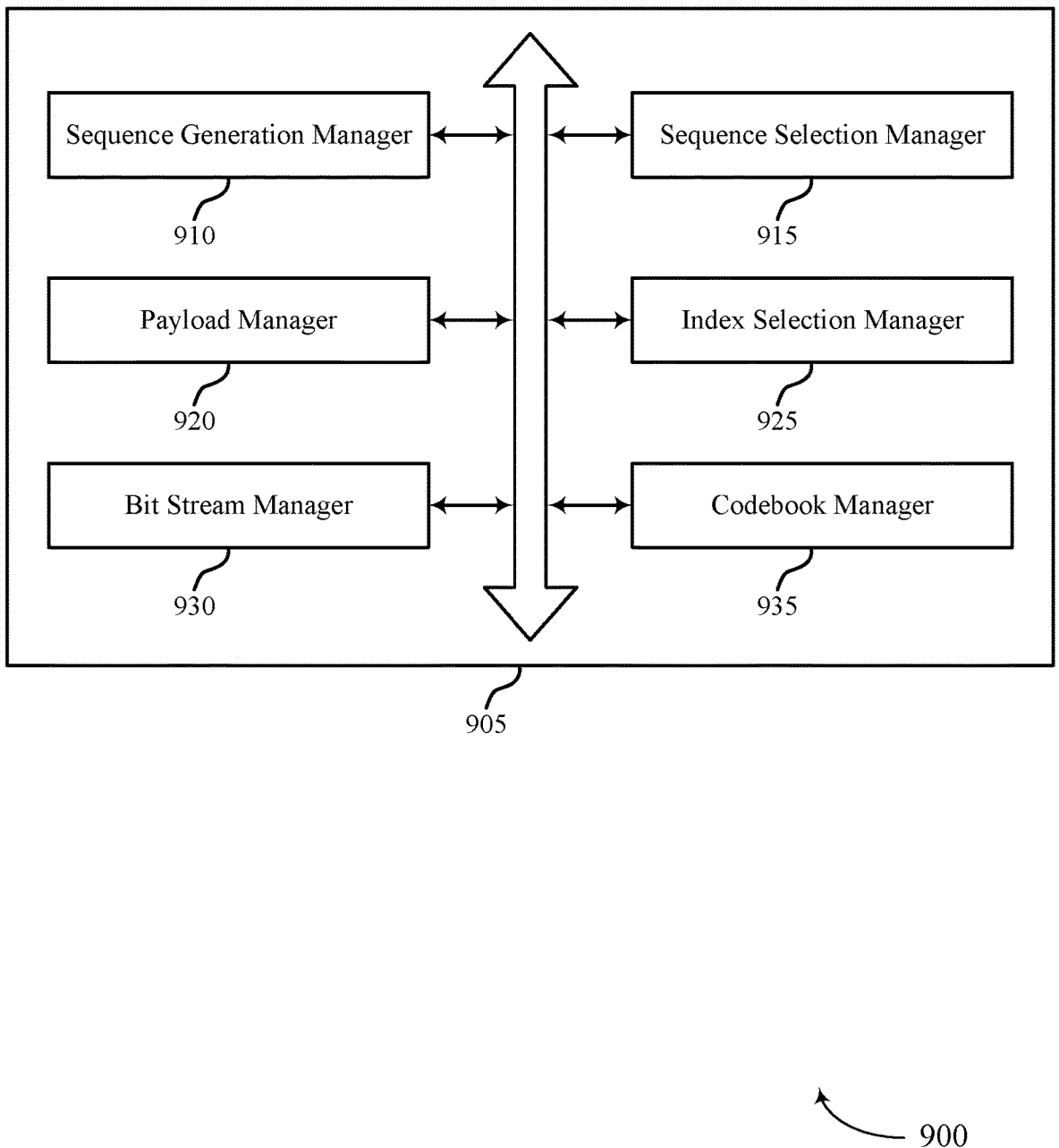
FIG. 9 shows a block diagram of a communications manager that supports orthogonal sequence generation for multi-bit payloads in accordance with aspects of the present disclosure.

FIG. 9 shows a block diagram 900 of a communications manager 905 that supports orthogonal sequence generation for multi-bit payloads in accordance with aspects of the present disclosure. The communications manager 905 may be an example of aspects of a communications manager 715, a communications manager 815, or a communications manager 1010 described herein. The communications manager 905 may include a sequence generation manager 910, a sequence selection manager 915, a payload manager 920, an index selection manager 925, a bit stream manager 930, and a codebook manager 935. Each of these modules may communicate, directly or indirectly, with one another (e.g., via one or more buses).

The sequence generation manager 910 may identify a set of orthogonal sequences for conveying a payload including a set of bits, where a number of the set of orthogonal sequences is based on a number of time periods for conveying the payload and a number of frequency tones for conveying the payload. In some examples, the sequence generation manager 910 may select a sequence from the subset of the set of orthogonal sequences based on a mapping between the subset of the set of orthogonal sequences and the set of bits.

In some examples, the sequence generation manager 910 may generate the set of orthogonal sequences based on a product of an orthogonal matrix having a size corresponding to the number of time periods and a cyclically shifted cell-specific sequence having a length corresponding to the number of frequency tones. In some cases, the product includes a Kronecker product. In some cases, the orthogonal matrix includes a DFT matrix.

The sequence selection manager 915 may select a subset of the set of orthogonal sequences for conveying the payload, where a size of the subset of the set of orthogonal sequences is based on a number of the set of bits. In some examples, the sequence selection manager 915 may determine the subset of the set of orthogonal sequences based on the first number, the first starting index, the first index interval, the second number, the second starting index, and the second index interval. In some examples, the sequence selection manager 915 may determine the subset of the set of orthogonal sequences based on the third starting index and the third index interval. In some examples, the sequence selection manager 915 may determine a first number of indices associated with the orthogonal matrix based on the first number and determine a second number of indices associated with the cyclically shifted cell-specific sequence based on the second number.

The payload manager 920 may transmit the payload including the set of bits using the selected sequence. In some cases, the payload including the set of bits includes an uplink control information message. In some cases, the wireless device may be an example of a UE, and transmitting the payload may include transmitting the payload on an uplink channel. In some cases, the wireless device may be an example of a UE, and transmitting the payload may include transmitting the payload on a sidelink channel. In some cases, the wireless device may be an example of a base station, and transmitting the payload may include transmitting the payload on a downlink channel.

The index selection manager 925 may identify a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence. In some examples, the index selection manager 925 may receive an indication of the first number, an indication of the second number, or both. In some examples, the index selection manager 925 may receive an indication of the first starting index, an indication of the second starting index, or both.

In some examples, the index selection manager 925 may receive an indication of the first index interval, an indication of the second index interval, or both. In some examples, the index selection manager 925 may determine the first index interval based on a maximum index interval for indices of the orthogonal matrix. In some examples, the index selection manager 925 may determine the second index interval based on a maximum index interval for indices of the cyclically shifted cell-specific sequence.

In some examples, the index selection manager 925 may identify a set of joint indices based on a product of the number of time periods and the number of frequency tones. In some examples, the index selection manager 925 may identify a third starting index associated with the set of joint indices and a third index interval associated with the set of joint indices. In some examples, the index selection manager 925 may receive an indication of the third starting index. In some examples, the index selection manager 925 may receive an indication of the third index interval.

In some examples, the index selection manager 925 may determine the third index interval based on a maximum index interval for indices of the set of joint indices. In some cases, the first index interval includes a function of the number of time periods and the first number of indices and the second index interval includes a function of the number of frequency tones and the second number of indices.

In some cases, the function of the number of time periods and the function of the number of frequency tones each further includes a modulo function, a floor function, a ceiling function, or a combination thereof. In some cases, a summation of the first number associated with the orthogonal matrix and the second number associated with the cyclically shifted cell-specific sequence equals the number of the set of bits.

The bit stream manager 930 may convert the set of bits into a decimal number, where the mapping between the subset of the set of orthogonal sequences and the set of bits is based on a second mapping between the decimal number and an index of the subset of the set of orthogonal sequences.

The codebook manager 935 may construct a codebook and include the subset of the set of orthogonal sequences in the constructed codebook. In some cases, the subset of the set of orthogonal sequences includes a codebook for conveying the payload including the set of bits.

Figure 10:
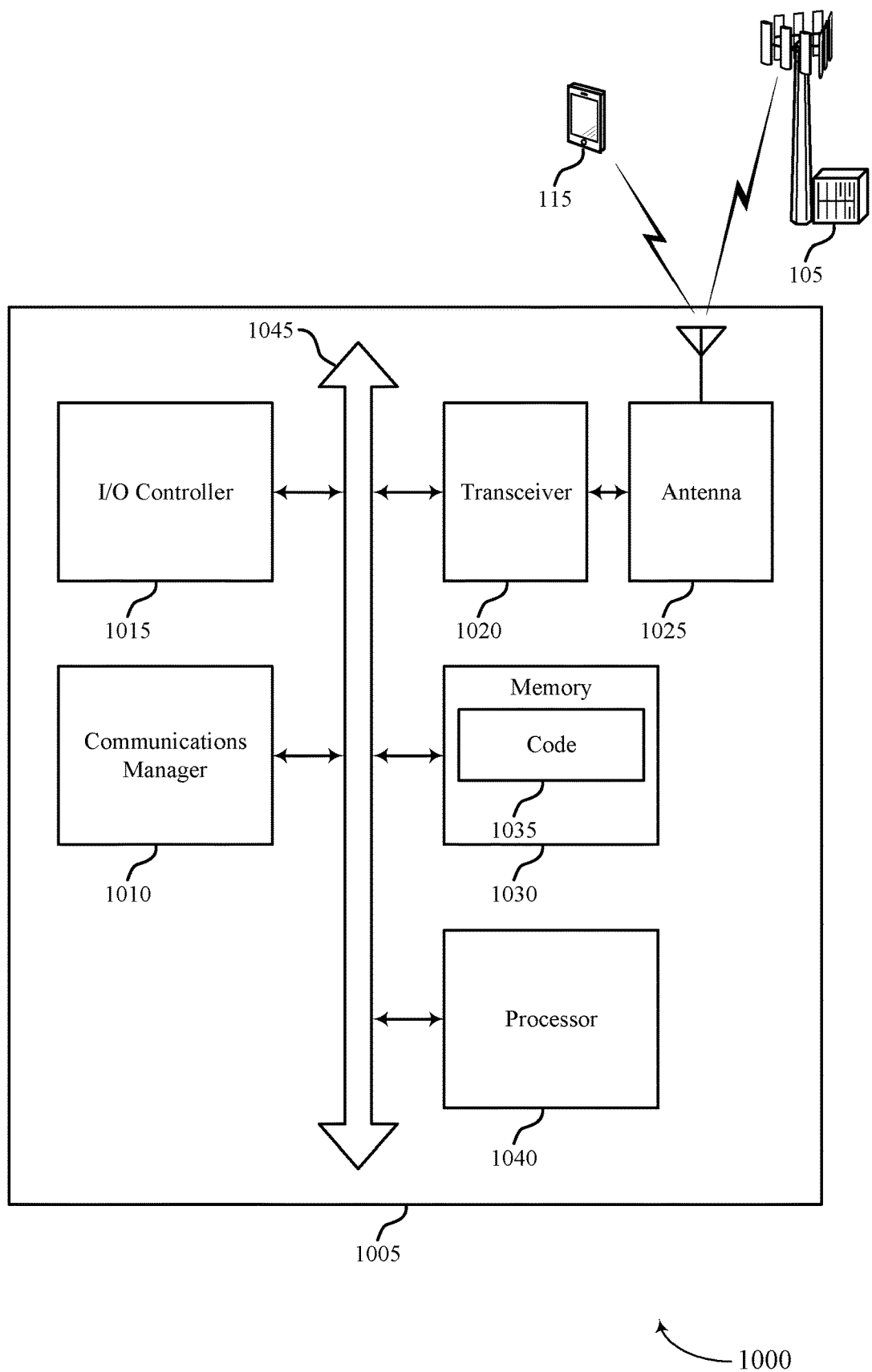
FIG. 10 shows a diagram of a system including a device that supports orthogonal sequence generation for multi-bit payloads in accordance with aspects of the present disclosure.

FIG. 10 shows a diagram of a system 1000 including a device 1005 that supports orthogonal sequence generation for multi-bit payloads in accordance with aspects of the present disclosure. The device 1005 may be an example of or include the components of device 705, device 805, a UE 115, or a base station 105 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a set of orthogonal sequences for conveying a payload including a set of bits, where a number of the set of orthogonal sequences is based on a number of time periods for conveying the payload and a number of frequency tones for conveying the payload, select a sequence from the subset of the set of orthogonal sequences based on a mapping between the subset of the set of orthogonal sequences and the set of bits, select a subset of the set of orthogonal sequences for conveying the payload, where a size of the subset of the set of orthogonal sequences is based on a number of the set of bits, and transmit the payload including the set of bits using the selected sequence.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases, the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting orthogonal sequence generation for multi-bit payloads).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
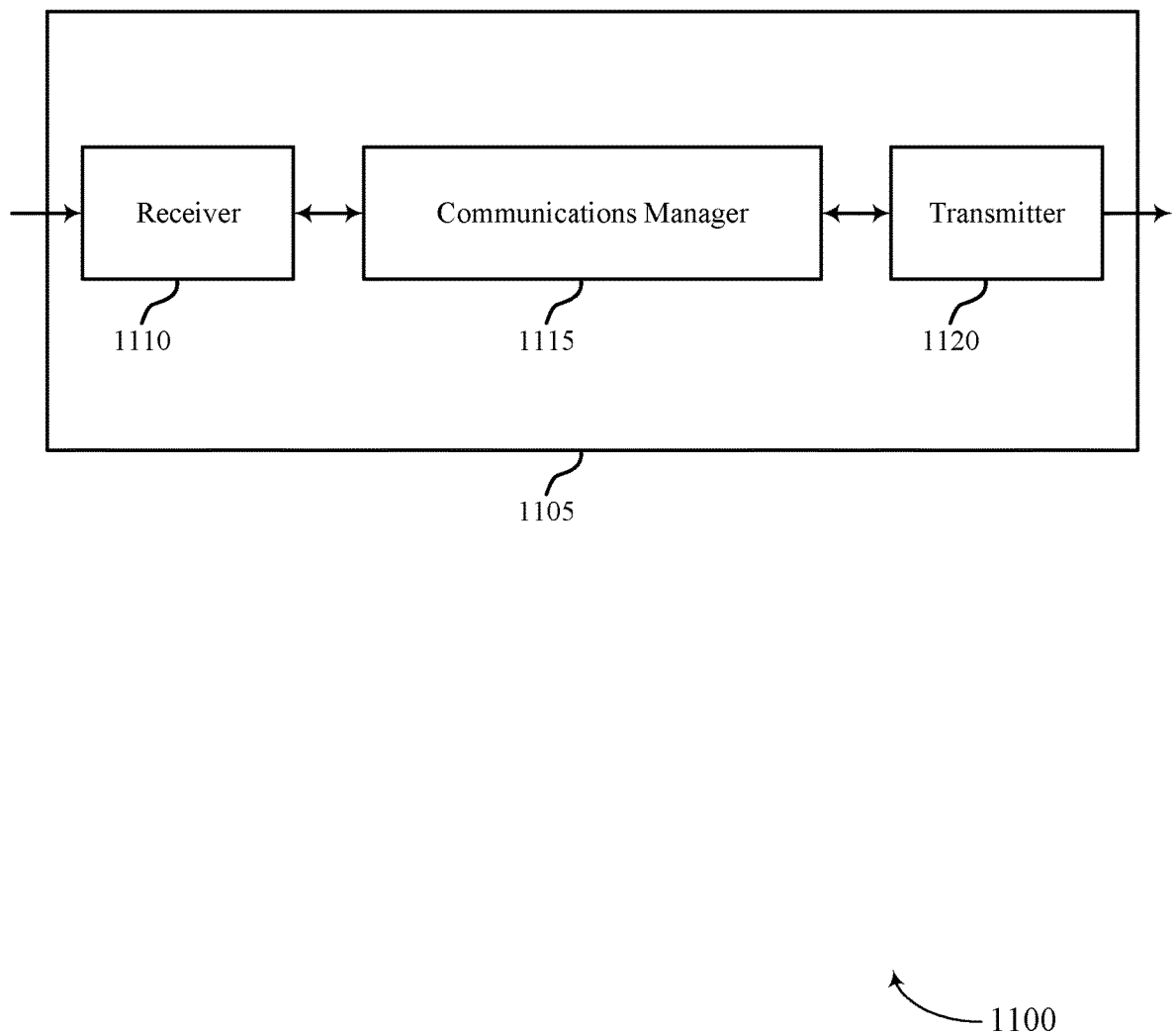
FIGS. 11 and 12 show block diagrams of devices that support orthogonal sequence generation for multi-bit payloads in accordance with aspects of the present disclosure.

FIG. 11 shows a block diagram 1100 of a device 1105 that supports orthogonal sequence generation for multi-bit payloads in accordance with aspects of the present disclosure. The device 1105 may be an example of aspects of a base station 105 or a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to orthogonal sequence generation for multi-bit payloads, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a set of orthogonal sequences for conveying a payload including a set of bits, where a number of the set of orthogonal sequences is based on a number of time periods for conveying the payload and a number of frequency tones for conveying the payload, determine a subset of the set of orthogonal sequences for conveying the payload, where a size of the subset of the set of orthogonal sequences is based on a number of the set of bits, and receive the payload including the set of bits using a selected sequence from the subset of the set of orthogonal sequences, the selected sequence based on a mapping between the subset of the set of orthogonal sequences and the set of bits. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

As described herein, the device 1105 may be implemented to realize one or more potential advantages. In some examples, the device 1105 may assist a UE in selection of a subset of orthogonal sequences that the UE may use to convey a payload of a number of bits. As such, the device 1105 may facilitate the use of orthogonal sequences to convey a payload from a UE to the device 1105 and such use of orthogonal sequences may be associated with lower latency and higher reliability than the use of non-orthogonal sequences, such that the device 1105 may have a greater likelihood of successfully receiving the payload from the UE. As such, the device 1105 may perform fewer operations associated with monitoring for a re-transmission of the payload, which may improve power saving and resource-usage of the device 1105.

Figure 12:
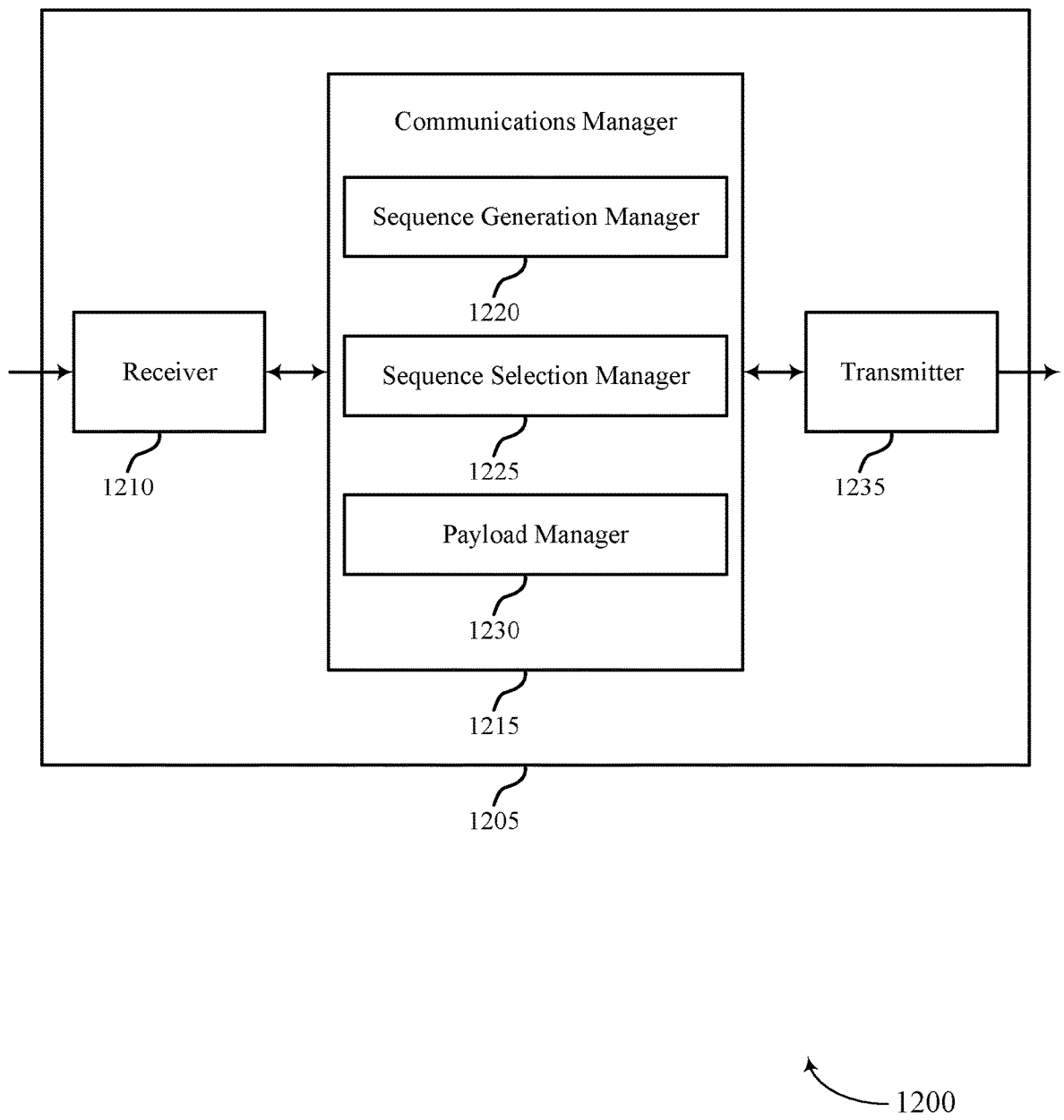

FIG. 12 shows a block diagram 1200 of a device 1205 that supports orthogonal sequence generation for multi-bit payloads in accordance with aspects of the present disclosure. The device 1205 may be an example of aspects of a device 1105, a base station 105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to orthogonal sequence generation for multi-bit payloads, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a sequence generation manager 1220, a sequence selection manager 1225, and a payload manager 1230. The communications manager 1215 may be an example of aspects of the communications manager 1410 described herein.

The sequence generation manager 1220 may identify a set of orthogonal sequences for conveying a payload including a set of bits, where a number of the set of orthogonal sequences is based on a number of time periods for conveying the payload and a number of frequency tones for conveying the payload. The sequence selection manager 1225 may determine a subset of the set of orthogonal sequences for conveying the payload, where a size of the subset of the set of orthogonal sequences is based on a number of the set of bits. The payload manager 1230 may receive the payload including the set of bits using a selected sequence from the subset of the set of orthogonal sequences, the selected sequence based on a mapping between the subset of the set of orthogonal sequences and the set of bits.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
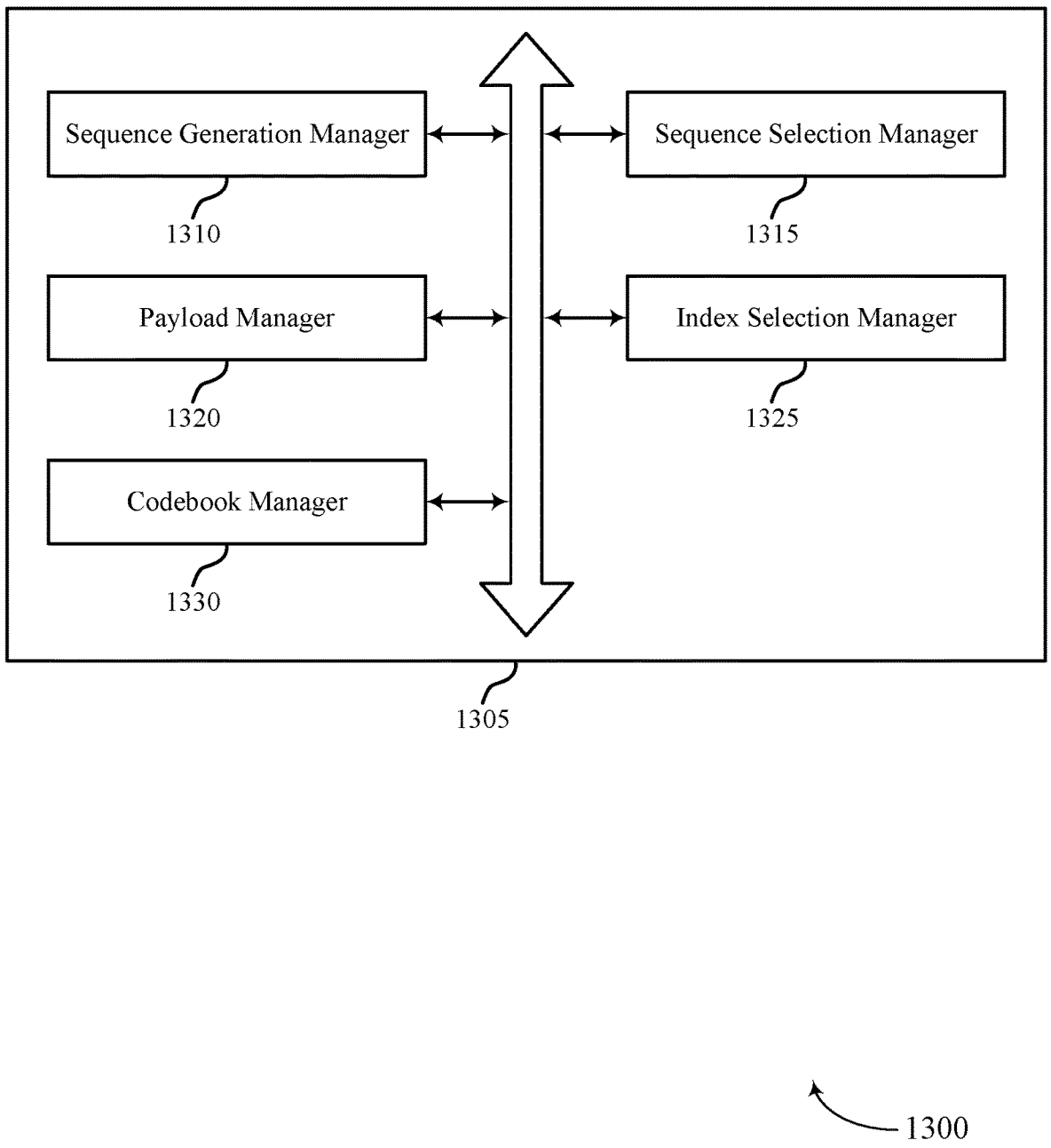
FIG. 13 shows a block diagram of a communications manager that supports orthogonal sequence generation for multi-bit payloads in accordance with aspects of the present disclosure.

FIG. 13 shows a block diagram 1300 of a communications manager 1305 that supports orthogonal sequence generation for multi-bit payloads in accordance with aspects of the present disclosure. The communications manager 1305 may be an example of aspects of a communications manager 1115, a communications manager 1215, or a communications manager 1410 described herein. The communications manager 1305 may include a sequence generation manager 1310, a sequence selection manager 1315, a payload manager 1320, an index selection manager 1325, and a codebook manager 1330. Each of these modules may communicate, directly or indirectly, with one another (e.g., via one or more buses).

The sequence generation manager 1310 may identify a set of orthogonal sequences for conveying a payload including a set of bits, where a number of the set of orthogonal sequences is based on a number of time periods for conveying the payload and a number of frequency tones for conveying the payload. In some examples, the sequence generation manager 1310 may generate the set of orthogonal sequences based on a product of an orthogonal matrix having a size corresponding to the number of time periods and a cyclically shifted cell-specific sequence having a length corresponding to the number of frequency tones. In some cases, the product includes a Kronecker product. In some cases, the orthogonal matrix includes a DFT matrix.

The sequence selection manager 1315 may determine a subset of the set of orthogonal sequences for conveying the payload, where a size of the subset of the set of orthogonal sequences is based on a number of the set of bits. In some examples, the sequence selection manager 1315 may determine the subset of the set of orthogonal sequences based on the first number, the first starting index, the first index interval, the second number, the second starting index, and the second index interval. In some examples, the sequence selection manager 1315 may determine the subset of the set of orthogonal sequences based on the third starting index and the third index interval. In some examples, the sequence manager 1315 may determine a first number of indices associated with the orthogonal matrix based on the first number and determine a second number of indices associated with the cyclically shifted cell-specific sequence based on the second number.

The payload manager 1320 may receive the payload including the set of bits using a selected sequence from the subset of the set of orthogonal sequences, the selected sequence based on a mapping between the subset of the set of orthogonal sequences and the set of bits. In some cases, the payload including the set of bits includes an uplink control information message. In some cases, the wireless device may be an example of a base station, and receiving the payload may include receiving the payload on an uplink channel. In some cases, the wireless device may be an example of a UE, and receiving the payload may include receiving the payload on an sidelink channel. In some cases, the wireless device may be an example of a UE, and receiving the payload may include receiving the payload on a downlink channel.

The index selection manager 1325 may identify a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence. In some examples, the index selection manager 1325 may receive an indication of the first number, an indication of the second number, or both. In some examples, the index selection manager 1325 may transmit an indication of the first starting index, an indication of the second starting index, or both.

In some examples, the index selection manager 1325 may transmit an indication of the first index interval, an indication of the second index interval or both. In some examples, the index selection manager 1325 may identify a set of joint indices based on a product of the number of time periods and the number of frequency tones. In some examples, the index selection manager 1325 may identify a third starting index associated with the set of joint indices and a third index interval associated with the set of joint indices. In some examples, the index selection manager 1325 may transmit an indication of the third starting index.

In some examples, the index selection manager 1325 may transmit an indication of the third index interval. In some cases, the first index interval includes a function of the number of time periods and the first number of indices and the second index interval includes a function of the number of frequency tones and the second number of indices. In some cases, the function of the number of time periods and the function of the number of frequency tones each further includes a modulo function, a floor function, a ceiling function, or a combination thereof. In some cases, a summation of the first number associated with the orthogonal matrix and the second number associated with the cyclically shifted cell-specific sequence equals the number of the set of bits.

The codebook manager 1330 may include the subset of the set of orthogonal sequences in a constructed codebook. In some cases, the subset of the set of orthogonal sequences includes a codebook for conveying the payload including the set of bits.

Figure 14:
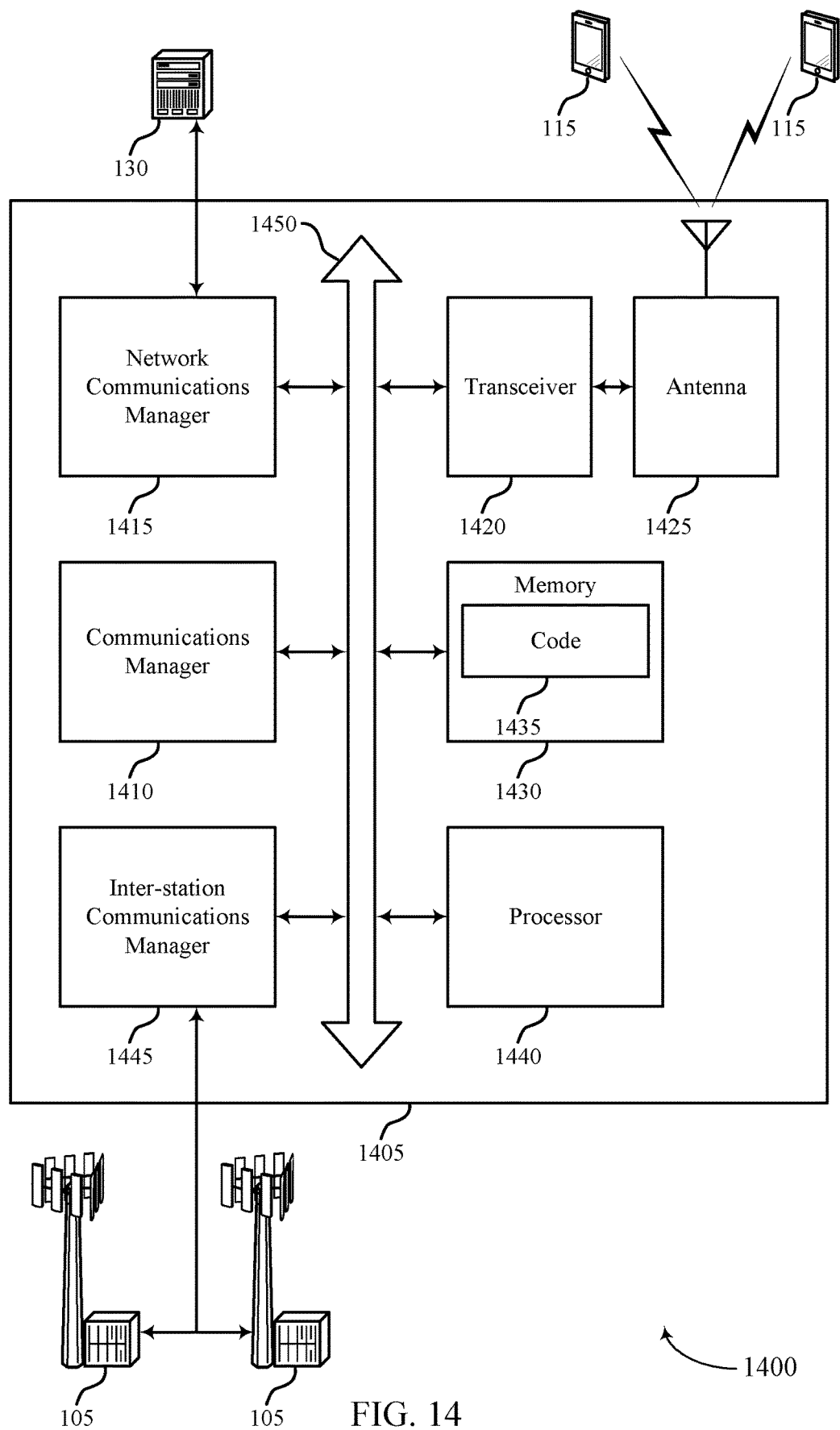
FIG. 14 shows a diagram of a system including a device that supports orthogonal sequence generation for multi-bit payloads in accordance with aspects of the present disclosure.

FIG. 14 shows a diagram of a system 1400 including a device 1405 that supports orthogonal sequence generation for multi-bit payloads in accordance with aspects of the present disclosure. The device 1405 may be an example of or include the components of device 1105, device 1205, a base station 105, or a UE 115 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a set of orthogonal sequences for conveying a payload including a set of bits, where a number of the set of orthogonal sequences is based on a number of time periods for conveying the payload and a number of frequency tones for conveying the payload, determine a subset of the set of orthogonal sequences for conveying the payload, where a size of the subset of the set of orthogonal sequences is based on a number of the set of bits, and receive the payload including the set of bits using a selected sequence from the subset of the set of orthogonal sequences, the selected sequence based on a mapping between the subset of the set of orthogonal sequences and the set of bits.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting orthogonal sequence generation for multi-bit payloads).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
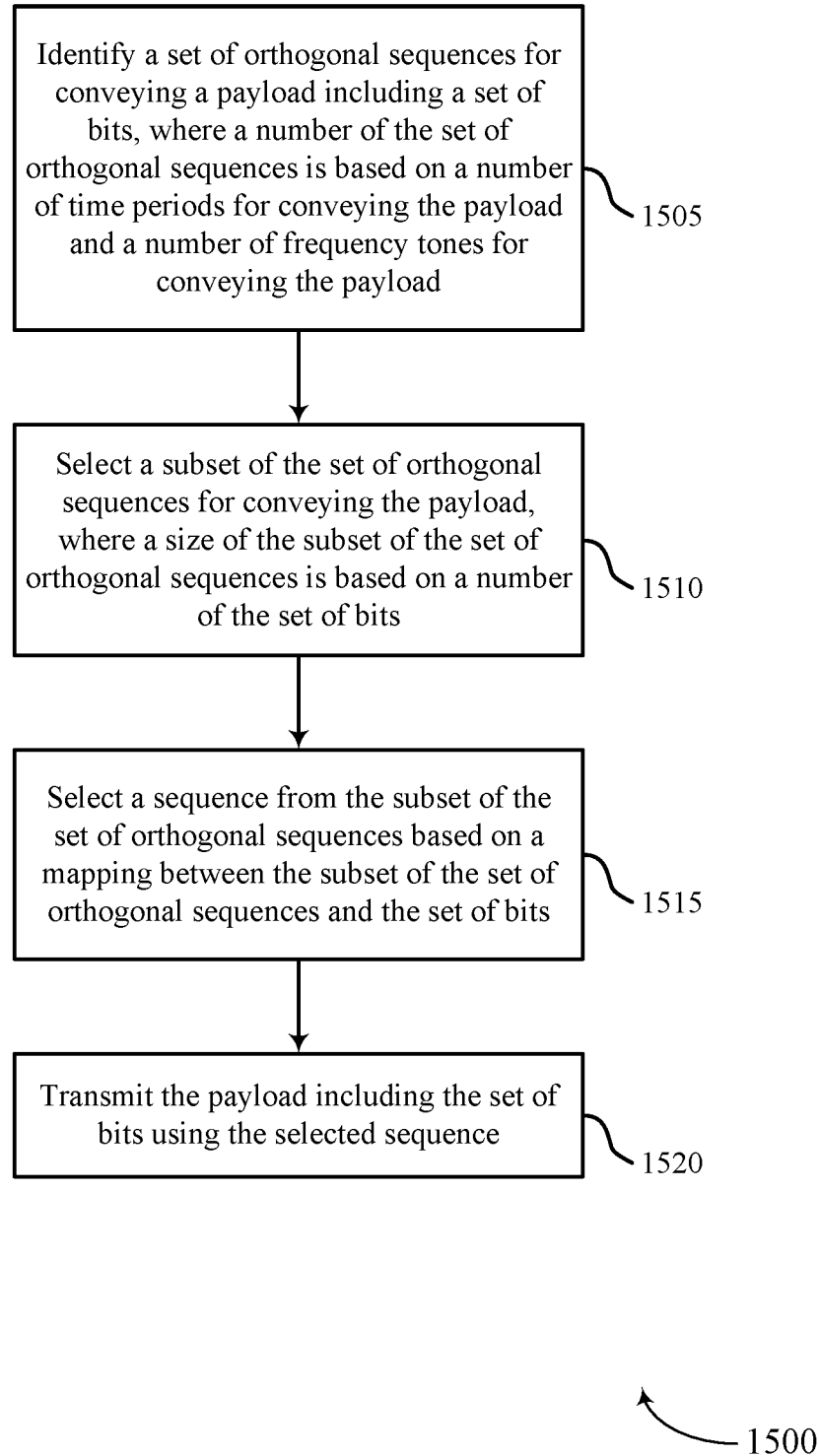
FIGS. 15 through 22 show flowcharts illustrating methods that support orthogonal sequence generation for multi-bit payloads in accordance with aspects of the present disclosure.

FIG. 15 shows a flowchart illustrating a method 1500 that supports orthogonal sequence generation for multi-bit payloads in accordance with aspects of the present disclosure. The operations of method 1500 may be implemented by a UE 115 or a base station 105, or by the components of a UE 115 or a base station 105 as described herein. For example, the operations of method 1500 may be performed by a communications manager as described with reference to FIGS. 7 through 10. In some examples, a wireless device (e.g., a UE or a base station) may execute a set of instructions to control the functional elements of the wireless device to perform the functions described herein. Additionally or alternatively, a wireless device may perform aspects of the functions described herein using special-purpose hardware.

At 1505, the wireless device may identify a set of orthogonal sequences for conveying a payload including a set of bits, where a number of the set of orthogonal sequences is based on a number of time periods for conveying the payload and a number of frequency tones for conveying the payload. The operations of 1505 may be performed according to the methods described herein. In some examples, aspects of the operations of 1505 may be performed by a sequence generation manager as described with reference to FIGS. 7 through 10.

At 1510, the wireless device may select a subset of the set of orthogonal sequences for conveying the payload, where a size of the subset of the set of orthogonal sequences is based on a number of the set of bits. The operations of 1510 may be performed according to the methods described herein. In some examples, aspects of the operations of 1510 may be performed by a sequence selection manager as described with reference to FIGS. 7 through 10.

At 1515, the wireless device may select a sequence from the subset of the set of orthogonal sequences based on a mapping between the subset of the set of orthogonal sequences and the set of bits. The operations of 1515 may be performed according to the methods described herein. In some examples, aspects of the operations of 1515 may be performed by a sequence generation manager as described with reference to FIGS. 7 through 10.

At 1520, the wireless device may transmit the payload including the set of bits using the selected sequence. The operations of 1520 may be performed according to the methods described herein. In some examples, aspects of the operations of 1520 may be performed by a payload manager as described with reference to FIGS. 7 through 10.

Figure 16:
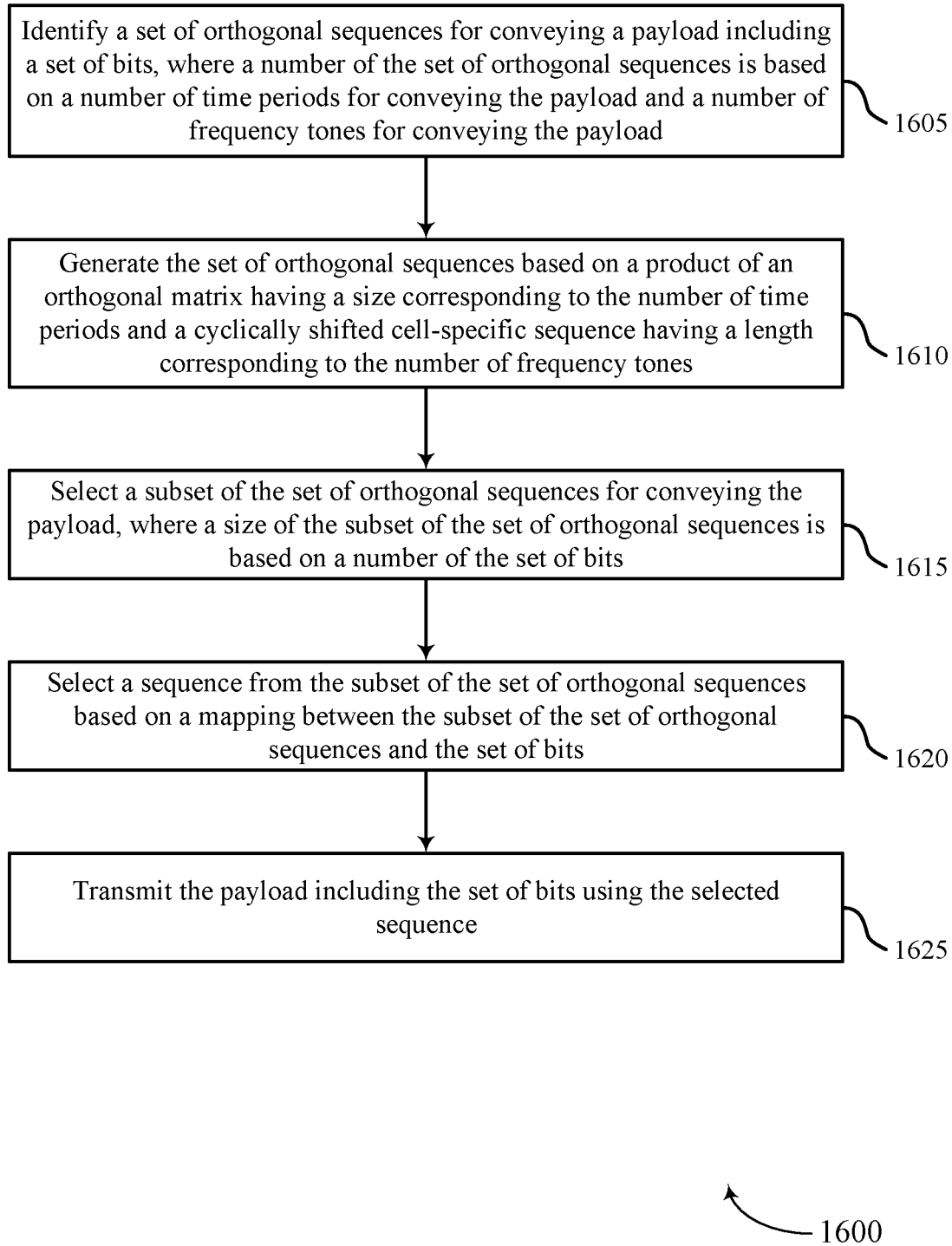

FIG. 16 shows a flowchart illustrating a method 1600 that supports orthogonal sequence generation for multi-bit payloads in accordance with aspects of the present disclosure. The operations of method 1600 may be implemented by a UE 115 or by a base station 105, or by the components of a UE 115 or a base station 105 as described herein. For example, the operations of method 1600 may be performed by a communications manager as described with reference to FIGS. 7 through 10. In some examples, a wireless device (e.g., a UE or a base statin) may execute a set of instructions to control the functional elements of the wireless device to perform the functions described herein. Additionally or alternatively, a wireless device may perform aspects of the functions described herein using special-purpose hardware.

At 1605, the wireless device may identify a set of orthogonal sequences for conveying a payload including a set of bits, where a number of the set of orthogonal sequences is based on a number of time periods for conveying the payload and a number of frequency tones for conveying the payload. The operations of 1605 may be performed according to the methods described herein. In some examples, aspects of the operations of 1605 may be performed by a sequence generation manager as described with reference to FIGS. 7 through 10.

At 1610, the wireless device may generate the set of orthogonal sequences based on a product of an orthogonal matrix having a size corresponding to the number of time periods and a cyclically shifted cell-specific sequence having a length corresponding to the number of frequency tones. The operations of 1610 may be performed according to the methods described herein. In some examples, aspects of the operations of 1610 may be performed by a sequence generation manager as described with reference to FIGS. 7 through 10.

At 1615, the wireless device may select a subset of the set of orthogonal sequences for conveying the payload, where a size of the subset of the set of orthogonal sequences is based on a number of the set of bits. The operations of 1615 may be performed according to the methods described herein. In some examples, aspects of the operations of 1615 may be performed by a sequence selection manager as described with reference to FIGS. 7 through 10.

At 1620, the wireless device may select a sequence from the subset of the set of orthogonal sequences based on a mapping between the subset of the set of orthogonal sequences and the set of bits. The operations of 1620 may be performed according to the methods described herein. In some examples, aspects of the operations of 1620 may be performed by a sequence generation manager as described with reference to FIGS. 7 through 10.

At 1625, the wireless device may transmit the payload including the set of bits using the selected sequence. The operations of 1625 may be performed according to the methods described herein. In some examples, aspects of the operations of 1625 may be performed by a payload manager as described with reference to FIGS. 7 through 10.

Figure 17:
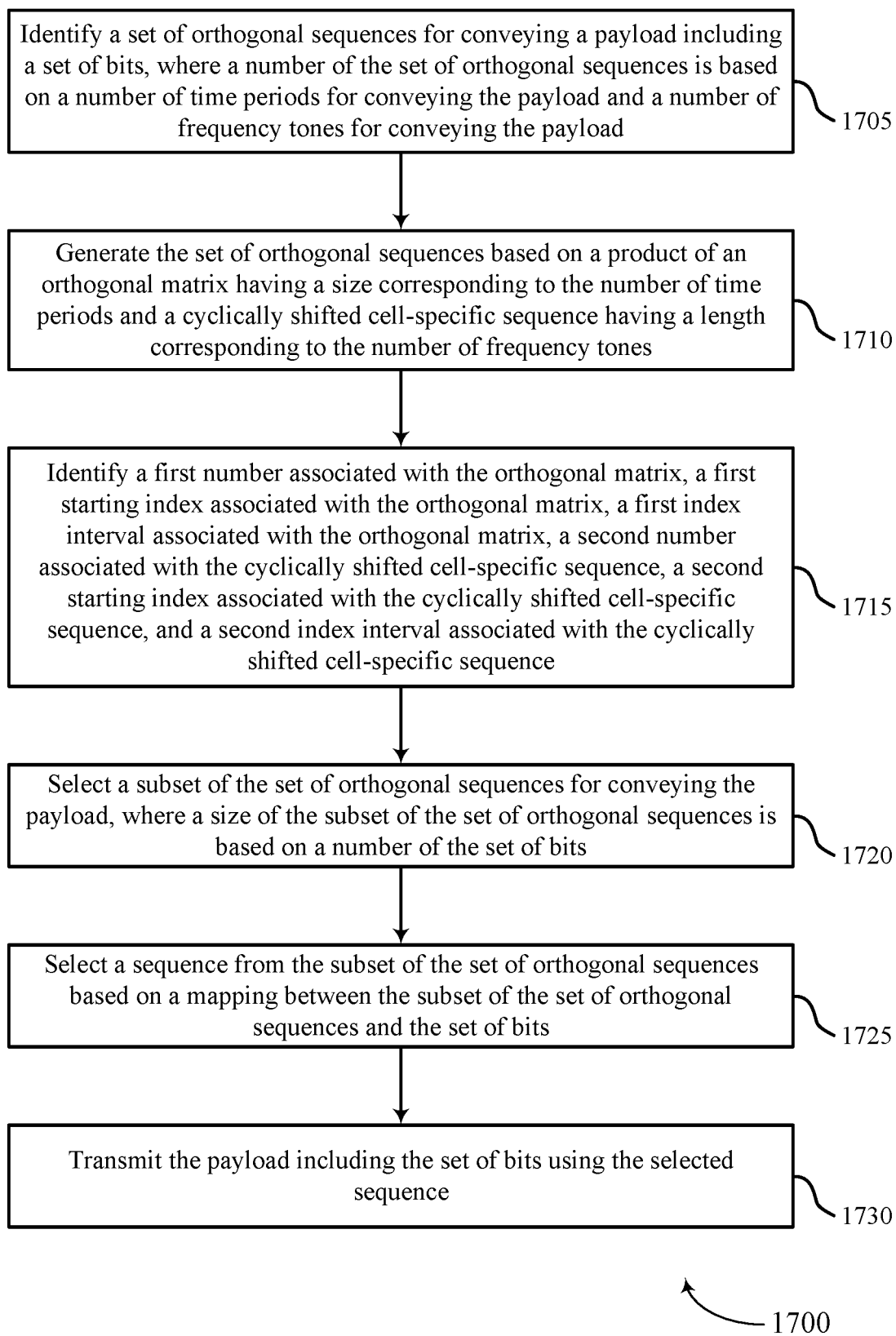

FIG. 17 shows a flowchart illustrating a method 1700 that supports orthogonal sequence generation for multi-bit payloads in accordance with aspects of the present disclosure. The operations of method 1700 may be implemented by a UE 115 or a base station 105, or by the components of a UE 115 or a base station 105 as described herein. For example, the operations of method 1700 may be performed by a communications manager as described with reference to FIGS. 7 through 10. In some examples, a wireless device (e.g., a UE or a base station) may execute a set of instructions to control the functional elements of the wireless device to perform the functions described herein. Additionally or alternatively, a wireless device may perform aspects of the functions described herein using special-purpose hardware.

At 1705, the wireless device may identify a set of orthogonal sequences for conveying a payload including a set of bits, where a number of the set of orthogonal sequences is based on a number of time periods for conveying the payload and a number of frequency tones for conveying the payload. The operations of 1705 may be performed according to the methods described herein. In some examples, aspects of the operations of 1705 may be performed by a sequence generation manager as described with reference to FIGS. 7 through 10.

At 1710, the wireless device may generate the set of orthogonal sequences based on a product of an orthogonal matrix having a size corresponding to the number of time periods and a cyclically shifted cell-specific sequence having a length corresponding to the number of frequency tones. The operations of 1710 may be performed according to the methods described herein. In some examples, aspects of the operations of 1710 may be performed by a sequence generation manager as described with reference to FIGS. 7 through 10.

At 1715, the wireless device may identify a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence. The operations of 1715 may be performed according to the methods described herein. In some examples, aspects of the operations of 1715 may be performed by an index selection manager as described with reference to FIGS. 7 through 10.

At 1720, the wireless device may select a subset of the set of orthogonal sequences for conveying the payload, where a size of the subset of the set of orthogonal sequences is based on a number of the set of bits. The operations of 1720 may be performed according to the methods described herein. In some examples, aspects of the operations of 1720 may be performed by a sequence selection manager as described with reference to FIGS. 7 through 10.

At 1725, the wireless device may select a sequence from the subset of the set of orthogonal sequences based on a mapping between the subset of the set of orthogonal sequences and the set of bits. The operations of 1725 may be performed according to the methods described herein. In some examples, aspects of the operations of 1725 may be performed by a sequence generation manager as described with reference to FIGS. 7 through 10.

At 1730, the wireless device may transmit the payload including the set of bits using the selected sequence. The operations of 1730 may be performed according to the methods described herein. In some examples, aspects of the operations of 1730 may be performed by a payload manager as described with reference to FIGS. 7 through 10.

Figure 18:
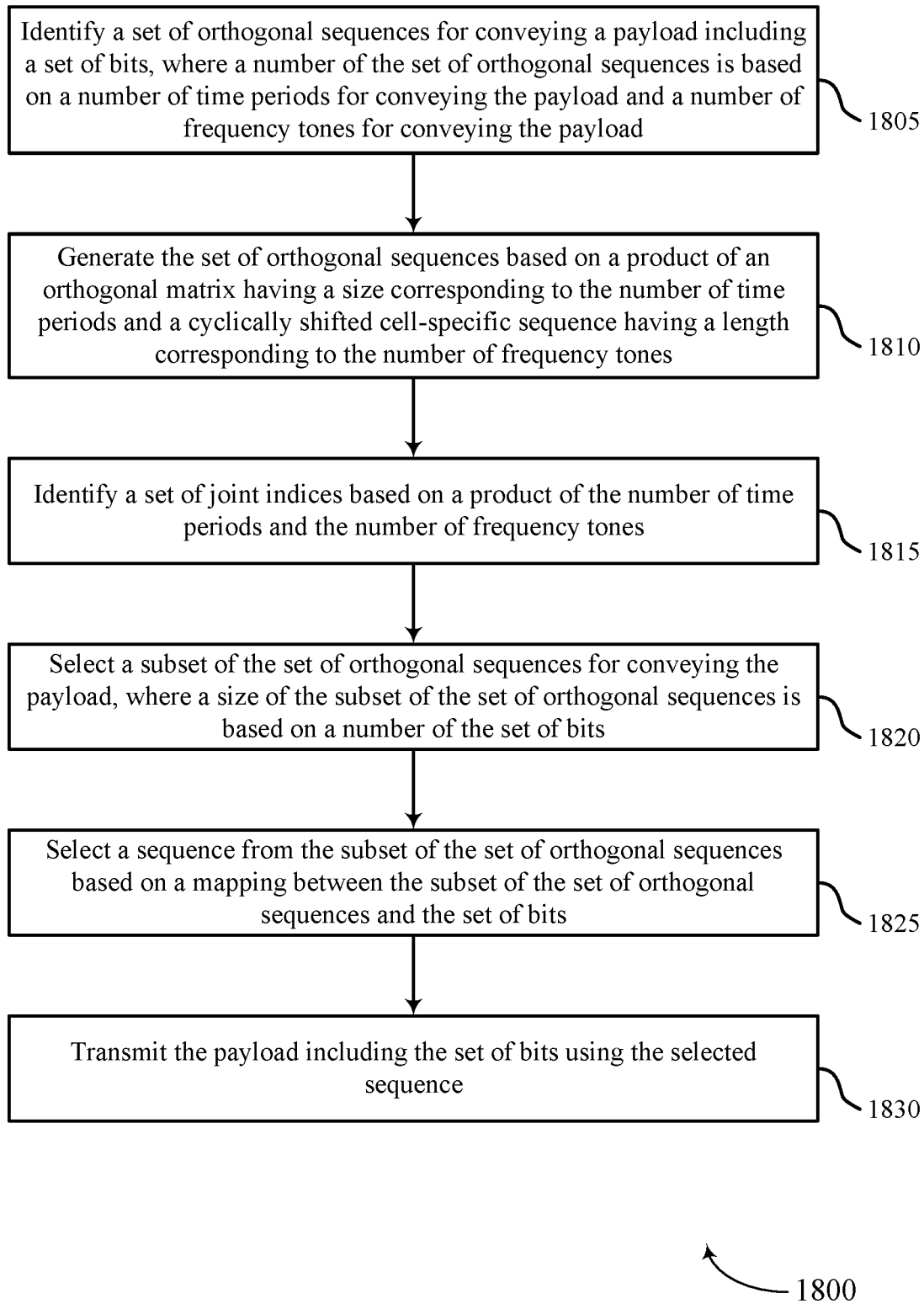

FIG. 18 shows a flowchart illustrating a method 1800 that supports orthogonal sequence generation for multi-bit payloads in accordance with aspects of the present disclosure. The operations of method 1800 may be implemented by a UE 115 or a base station 105, or by the components of a UE 115 or a base station 105 as described herein. For example, the operations of method 1800 may be performed by a communications manager as described with reference to FIGS. 7 through 10. In some examples, a wireless device (e.g., a UE or a base station) may execute a set of instructions to control the functional elements of the wireless device to perform the functions described herein. Additionally or alternatively, a wireless device may perform aspects of the functions described herein using special-purpose hardware.

At 1805, the wireless device may identify a set of orthogonal sequences for conveying a payload including a set of bits, where a number of the set of orthogonal sequences is based on a number of time periods for conveying the payload and a number of frequency tones for conveying the payload. The operations of 1805 may be performed according to the methods described herein. In some examples, aspects of the operations of 1805 may be performed by a sequence generation manager as described with reference to FIGS. 7 through 10.

At 1810, the wireless device may generate the set of orthogonal sequences based on a product of an orthogonal matrix having a size corresponding to the number of time periods and a cyclically shifted cell-specific sequence having a length corresponding to the number of frequency tones. The operations of 1810 may be performed according to the methods described herein. In some examples, aspects of the operations of 1810 may be performed by a sequence generation manager as described with reference to FIGS. 7 through 10.

At 1815, the wireless device may identify a set of joint indices based on a product of the number of time periods and the number of frequency tones. The operations of 1815 may be performed according to the methods described herein. In some examples, aspects of the operations of 1815 may be performed by an index selection manager as described with reference to FIGS. 7 through 10.

At 1820, the wireless device may select a subset of the set of orthogonal sequences for conveying the payload, where a size of the subset of the set of orthogonal sequences is based on a number of the set of bits. The operations of 1820 may be performed according to the methods described herein. In some examples, aspects of the operations of 1820 may be performed by a sequence selection manager as described with reference to FIGS. 7 through 10.

At 1825, the wireless device may select a sequence from the subset of the set of orthogonal sequences based on a mapping between the subset of the set of orthogonal sequences and the set of bits. The operations of 1825 may be performed according to the methods described herein. In some examples, aspects of the operations of 1825 may be performed by a sequence generation manager as described with reference to FIGS. 7 through 10.

At 1830, the wireless device may transmit the payload including the set of bits using the selected sequence. The operations of 1830 may be performed according to the methods described herein. In some examples, aspects of the operations of 1830 may be performed by a payload manager as described with reference to FIGS. 7 through 10.

Figure 19:
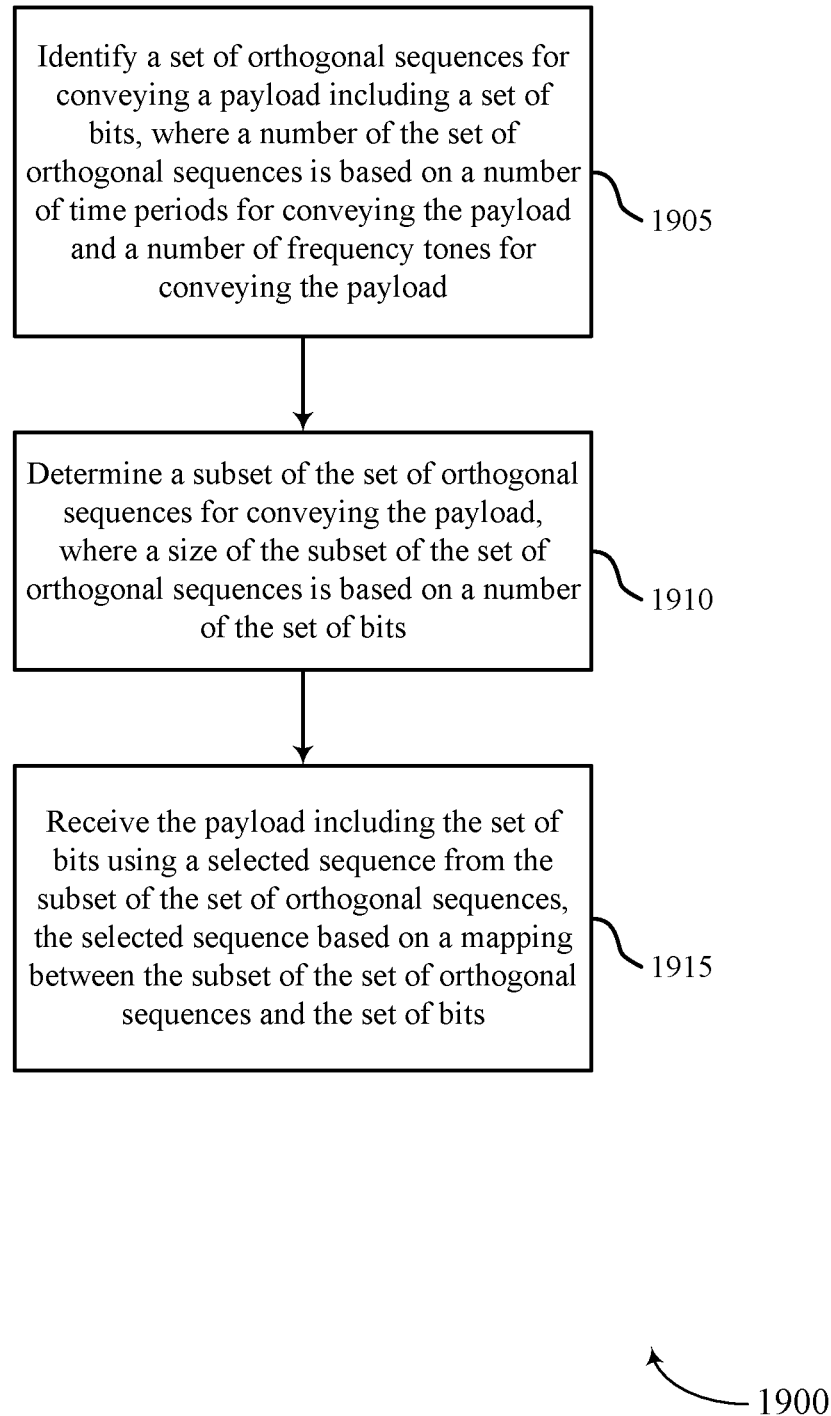

FIG. 19 shows a flowchart illustrating a method 1900 that supports orthogonal sequence generation for multi-bit payloads in accordance with aspects of the present disclosure. The operations of method 1900 may be implemented by a base station 105 or a UE 115, or by the components of a base station 105 or a UE 115 as described herein. For example, the operations of method 1900 may be performed by a communications manager as described with reference to FIGS. 11 through 14. In some examples, a wireless device (e.g., a base station or a UE) may execute a set of instructions to control the functional elements of the wireless device to perform the functions described herein. Additionally or alternatively, a wireless device may perform aspects of the functions described herein using special-purpose hardware.

At 1905, the wireless device may identify a set of orthogonal sequences for conveying a payload including a set of bits, where a number of the set of orthogonal sequences is based on a number of time periods for conveying the payload and a number of frequency tones for conveying the payload. The operations of 1905 may be performed according to the methods described herein. In some examples, aspects of the operations of 1905 may be performed by a sequence generation manager as described with reference to FIGS. 11 through 14.

At 1910, the wireless device may determine a subset of the set of orthogonal sequences for conveying the payload, where a size of the subset of the set of orthogonal sequences is based on a number of the set of bits. The operations of 1910 may be performed according to the methods described herein. In some examples, aspects of the operations of 1910 may be performed by a sequence selection manager as described with reference to FIGS. 11 through 14.

At 1915, the wireless device may receive the payload including the set of bits using a selected sequence from the subset of the set of orthogonal sequences, the selected sequence based on a mapping between the subset of the set of orthogonal sequences and the set of bits. The operations of 1915 may be performed according to the methods described herein. In some examples, aspects of the operations of 1915 may be performed by a payload manager as described with reference to FIGS. 11 through 14.

Figure 20:
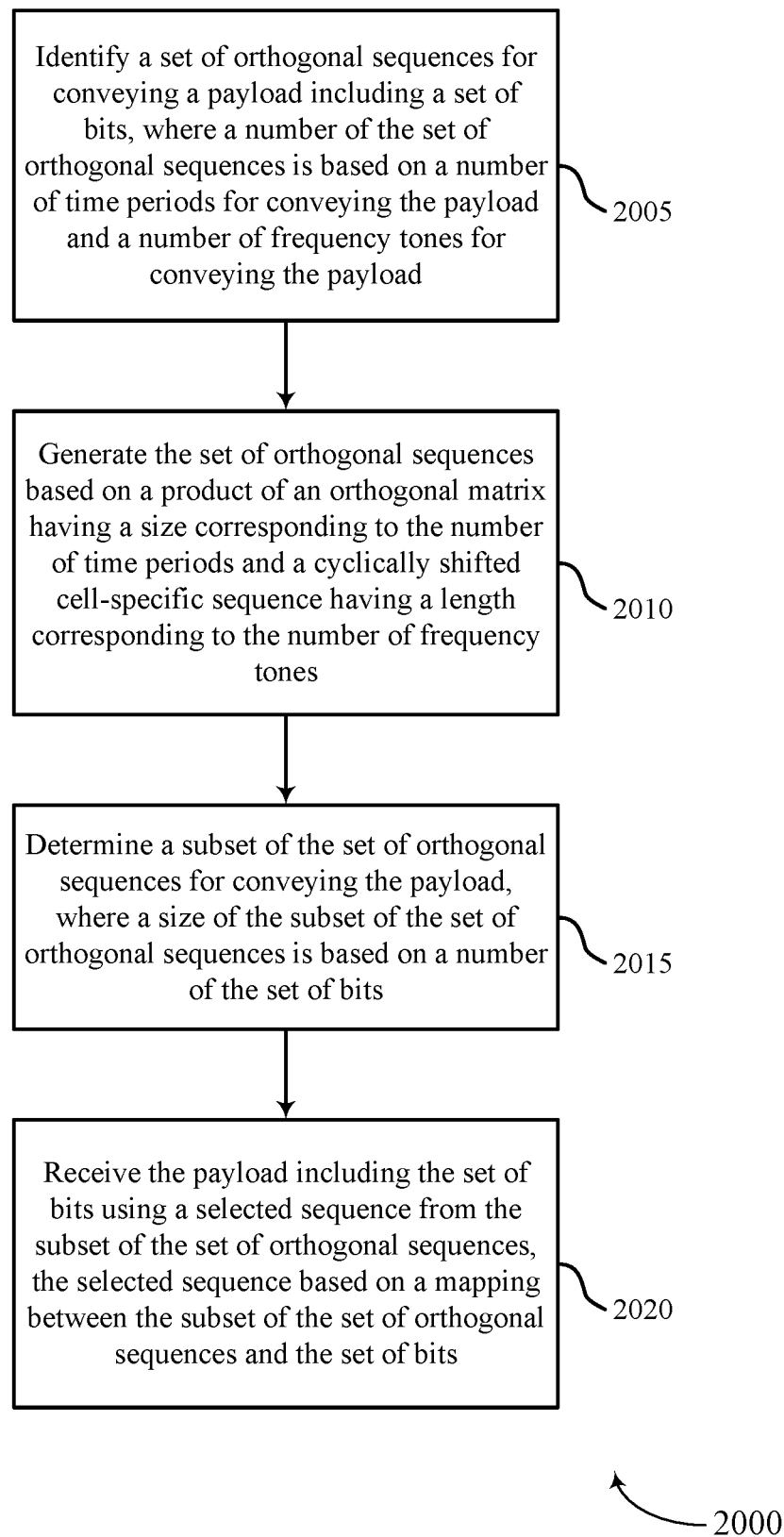

FIG. 20 shows a flowchart illustrating a method 2000 that supports orthogonal sequence generation for multi-bit payloads in accordance with aspects of the present disclosure. The operations of method 2000 may be implemented by a base station 105 or a UE 115, or by the components of a base station 105 or a UE 115 as described herein. For example, the operations of method 2000 may be performed by a communications manager as described with reference to FIGS. 11 through 14. In some examples, a wireless device (e.g., a base station or a UE) may execute a set of instructions to control the functional elements of the wireless device to perform the functions described herein. Additionally or alternatively, a wireless device may perform aspects of the functions described herein using special-purpose hardware.

At 2005, the wireless device may identify a set of orthogonal sequences for conveying a payload including a set of bits, where a number of the set of orthogonal sequences is based on a number of time periods for conveying the payload and a number of frequency tones for conveying the payload. The operations of 2005 may be performed according to the methods described herein. In some examples, aspects of the operations of 2005 may be performed by a sequence generation manager as described with reference to FIGS. 11 through 14.

At 2010, the wireless device may generate the set of orthogonal sequences based on a product of an orthogonal matrix having a size corresponding to the number of time periods and a cyclically shifted cell-specific sequence having a length corresponding to the number of frequency tones. The operations of 2010 may be performed according to the methods described herein. In some examples, aspects of the operations of 2010 may be performed by a sequence generation manager as described with reference to FIGS. 11 through 14.

At 2015, the wireless device may determine a subset of the set of orthogonal sequences for conveying the payload, where a size of the subset of the set of orthogonal sequences is based on a number of the set of bits. The operations of 2015 may be performed according to the methods described herein. In some examples, aspects of the operations of 2015 may be performed by a sequence selection manager as described with reference to FIGS. 11 through 14.

At 2020, the wireless device may receive the payload including the set of bits using a selected sequence from the subset of the set of orthogonal sequences, the selected sequence based on a mapping between the subset of the set of orthogonal sequences and the set of bits. The operations of 2020 may be performed according to the methods described herein. In some examples, aspects of the operations of 2020 may be performed by a payload manager as described with reference to FIGS. 11 through 14.

Figure 21:
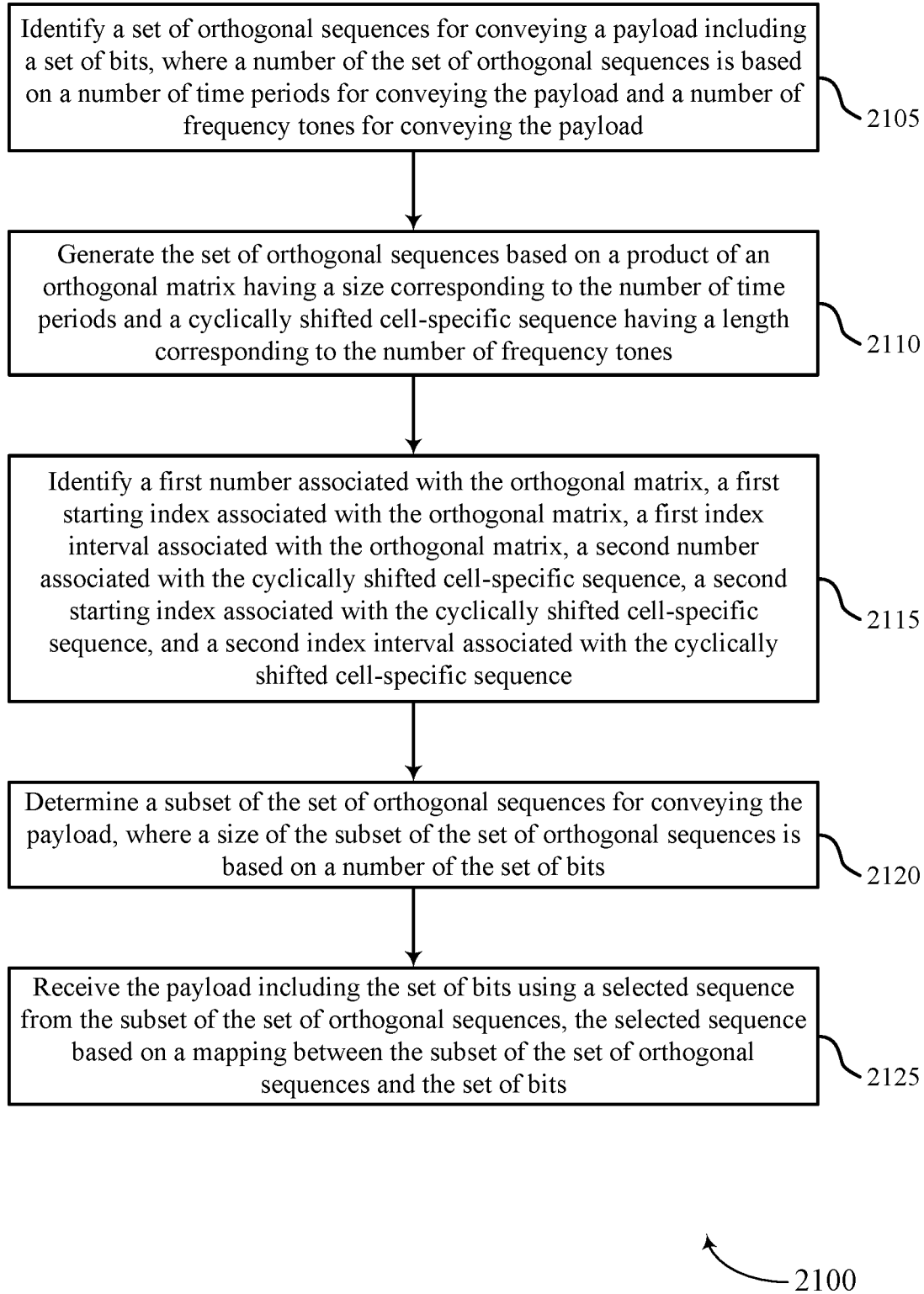

FIG. 21 shows a flowchart illustrating a method 2100 that supports orthogonal sequence generation for multi-bit payloads in accordance with aspects of the present disclosure. The operations of method 2100 may be implemented by a base station 105 or a UE 115, or by the components of a base station 105 or a UE 115 as described herein. For example, the operations of method 2100 may be performed by a communications manager as described with reference to FIGS. 11 through 14. In some examples, a wireless device (e.g., a base station or a UE) may execute a set of instructions to control the functional elements of the wireless device to perform the functions described herein. Additionally or alternatively, a wireless device may perform aspects of the functions described herein using special-purpose hardware.

At 2105, the wireless device may identify a set of orthogonal sequences for conveying a payload including a set of bits, where a number of the set of orthogonal sequences is based on a number of time periods for conveying the payload and a number of frequency tones for conveying the payload. The operations of 2105 may be performed according to the methods described herein. In some examples, aspects of the operations of 2105 may be performed by a sequence generation manager as described with reference to FIGS. 11 through 14.

At 2110, the wireless device may generate the set of orthogonal sequences based on a product of an orthogonal matrix having a size corresponding to the number of time periods and a cyclically shifted cell-specific sequence having a length corresponding to the number of frequency tones. The operations of 2110 may be performed according to the methods described herein. In some examples, aspects of the operations of 2110 may be performed by a sequence generation manager as described with reference to FIGS. 11 through 14.

At 2115, the wireless device may identify a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence. The operations of 2115 may be performed according to the methods described herein. In some examples, aspects of the operations of 2115 may be performed by an index selection manager as described with reference to FIGS. 11 through 14.

At 2120, the wireless device may determine a subset of the set of orthogonal sequences for conveying the payload, where a size of the subset of the set of orthogonal sequences is based on a number of the set of bits. The operations of 2120 may be performed according to the methods described herein. In some examples, aspects of the operations of 2120 may be performed by a sequence selection manager as described with reference to FIGS. 11 through 14.

At 2125, the wireless device may receive the payload including the set of bits using a selected sequence from the subset of the set of orthogonal sequences, the selected sequence based on a mapping between the subset of the set of orthogonal sequences and the set of bits. The operations of 2125 may be performed according to the methods described herein. In some examples, aspects of the operations of 2125 may be performed by a payload manager as described with reference to FIGS. 11 through 14.

Figure 22:
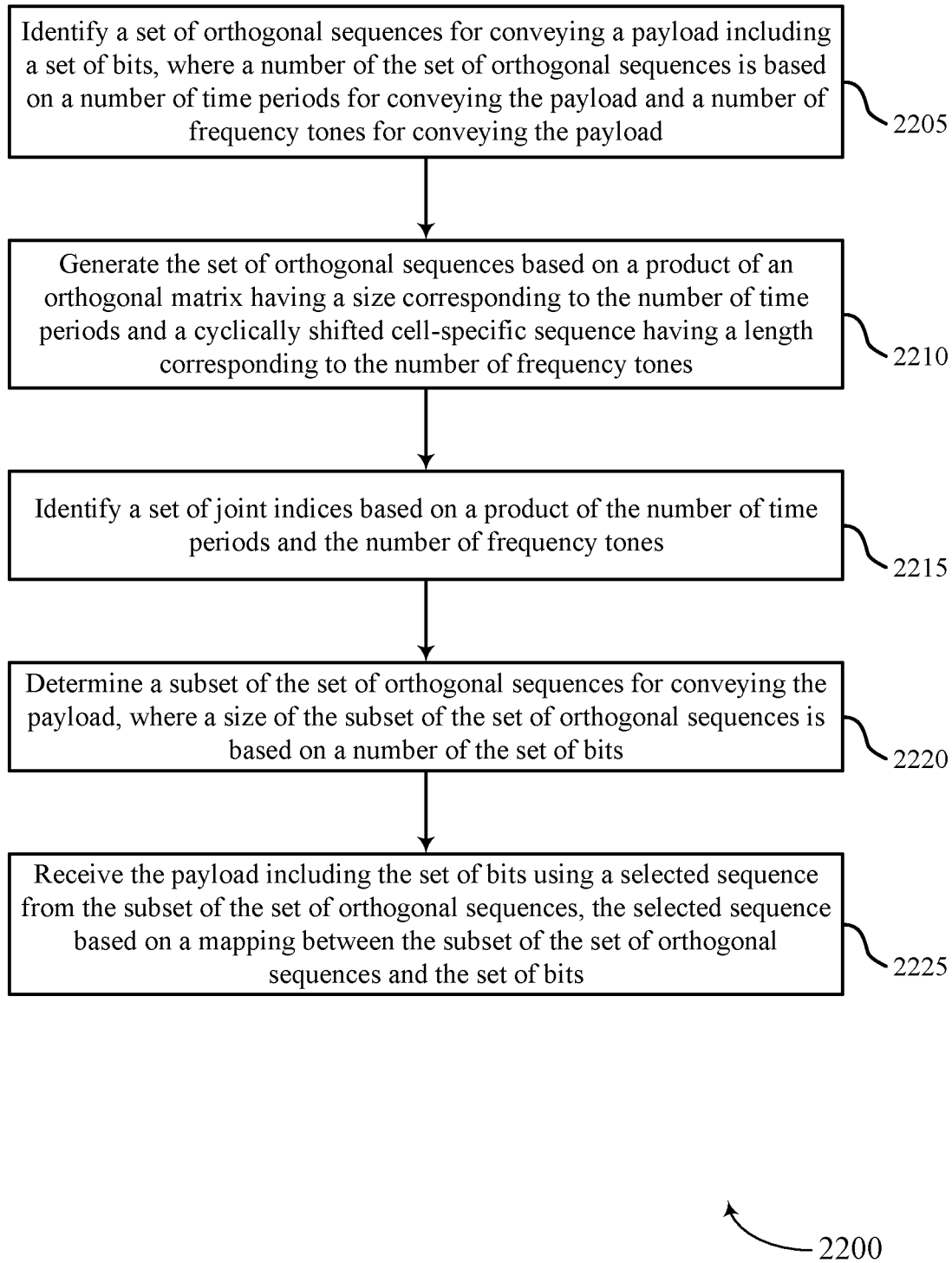

FIG. 22 shows a flowchart illustrating a method 2200 that supports orthogonal sequence generation for multi-bit payloads in accordance with aspects of the present disclosure. The operations of method 2200 may be implemented by a base station 105 or by a UE 115, or by the components of a base station 105 or a UE 115 as described herein. For example, the operations of method 2200 may be performed by a communications manager as described with reference to FIGS. 11 through 14. In some examples, a wireless device (e.g., a base station or a UE) may execute a set of instructions to control the functional elements of the wireless device to perform the functions described herein. Additionally or alternatively, a wireless device may perform aspects of the functions described herein using special-purpose hardware.

At 2205, the wireless device may identify a set of orthogonal sequences for conveying a payload including a set of bits, where a number of the set of orthogonal sequences is based on a number of time periods for conveying the payload and a number of frequency tones for conveying the payload. The operations of 2205 may be performed according to the methods described herein. In some examples, aspects of the operations of 2205 may be performed by a sequence generation manager as described with reference to FIGS. 11 through 14.

At 2210, the wireless device may generate the set of orthogonal sequences based on a product of an orthogonal matrix having a size corresponding to the number of time periods and a cyclically shifted cell-specific sequence having a length corresponding to the number of frequency tones. The operations of 2210 may be performed according to the methods described herein. In some examples, aspects of the operations of 2210 may be performed by a sequence generation manager as described with reference to FIGS. 11 through 14.

At 2215, the wireless device may identify a set of joint indices based on a product of the number of time periods and the number of frequency tones. The operations of 2215 may be performed according to the methods described herein. In some examples, aspects of the operations of 2215 may be performed by an index selection manager as described with reference to FIGS. 11 through 14.

At 2220, the wireless device may determine a subset of the set of orthogonal sequences for conveying the payload, where a size of the subset of the set of orthogonal sequences is based on a number of the set of bits. The operations of 2220 may be performed according to the methods described herein. In some examples, aspects of the operations of 2220 may be performed by a sequence selection manager as described with reference to FIGS. 11 through 14.

At 2225, the wireless device may receive the payload including the set of bits using a selected sequence from the subset of the set of orthogonal sequences, the selected sequence based on a mapping between the subset of the set of orthogonal sequences and the set of bits. The operations of 2225 may be performed according to the methods described herein. In some examples, aspects of the operations of 2225 may be performed by a payload manager as described with reference to FIGS. 11 through 14.

The following provides an overview of some aspects of the present disclosure:

Aspect 1: A method for wireless communications at a wireless device, comprising: identifying a plurality of orthogonal sequences for conveying a payload comprising a plurality of bits, wherein a number of the plurality of orthogonal sequences is based at least in part on a number of time periods for conveying the payload and a number of frequency tones for conveying the payload; selecting a subset of the plurality of orthogonal sequences for conveying the payload, wherein a size of the subset of the plurality of orthogonal sequences is based at least in part on a number of the plurality of bits; selecting a sequence from the subset of the plurality of orthogonal sequences based at least in part on a mapping between the subset of the plurality of orthogonal sequences and the plurality of bits; and transmitting the payload comprising the plurality of bits using the selected sequence.

Aspect 2: The method of aspect 1, further comprising: generating the plurality of orthogonal sequences based at least in part on a product of an orthogonal matrix having a size corresponding to the number of time periods and a cyclically shifted cell-specific sequence having a length corresponding to the number of frequency tones.

Aspect 3: The method of aspect 2, further comprising: identifying a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence.

Aspect 4: The method of aspect 3, further comprising: determining the subset of the plurality of orthogonal sequences based at least in part on the first number, the first starting index, the first index interval, the second number, the second starting index, and the second index interval.

Aspect 5: The method of any of aspects 3 through 4, further comprising: determining a first number of indices associated with the orthogonal matrix based at least in part on the first number; and determining a second number of indices associated with the cyclically shifted cell-specific sequence based at least in part on the second number.

Aspect 6: The method of aspect 5, wherein the first index interval comprises a function of the number of time periods and the first number of indices and the second index interval comprises a function of the number of frequency tones and the second number of indices.

Aspect 7: The method of any of aspects 3 through 6, further comprising: receiving an indication of the first number, an indication of the second number, an indication of the first starting index, an indication of the second starting index, an indication of the first index interval, an indication of the second index interval, or any combination thereof.

Aspect 8: The method of any of aspects 3 through 7, further comprising: determining the first index interval based at least in part on a maximum index interval for indices of the orthogonal matrix; and determining the second index interval based at least in part on a maximum index interval for indices of the cyclically shifted cell-specific sequence.

Aspect 9: The method of any of aspects 3 through 8, wherein a summation of the first number associated with the orthogonal matrix and the second number associated with the cyclically shifted cell-specific sequence equals the number of the plurality of bits.

Aspect 10: The method of aspect 2, further comprising: identifying a set of joint indices based at least in part on a product of the number of time periods and the number of frequency tones.

Aspect 11: The method of aspect 10, further comprising: identifying a third starting index associated with the set of joint indices and a third index interval associated with the set of joint indices; and determining the subset of the plurality of orthogonal sequences based at least in part on the third starting index and the third index interval.

Aspect 12: The method of aspect 11, further comprising: receiving an indication of the third starting index and an indication of the third index interval.

Aspect 13: The method of any of aspects 11 through 12, further comprising: determining the third index interval based at least in part on a maximum index interval for indices of the set of joint indices.

Aspect 14: The method of any of aspects 2 through 13, further comprising: converting the plurality of bits into a decimal number, wherein the mapping between the subset of the plurality of orthogonal sequences and the plurality of bits is based at least in part on a second mapping between the decimal number and an index of the subset of the plurality of orthogonal sequences.

Aspect 15: The method of any of aspects 1 through 14, wherein the subset of the plurality of orthogonal sequences comprises a codebook for conveying the payload comprising the plurality of bits.

Aspect 16: A method for wireless communications at a wireless device, comprising: identifying a plurality of orthogonal sequences for conveying a payload comprising a plurality of bits, wherein a number of the plurality of orthogonal sequences is based at least in part on a number of time periods for conveying the payload and a number of frequency tones for conveying the payload; determining a subset of the plurality of orthogonal sequences for conveying the payload, wherein a size of the subset of the plurality of orthogonal sequences is based at least in part on a number of the plurality of bits; and receiving the payload comprising the plurality of bits using a selected sequence from the subset of the plurality of orthogonal sequences, the selected sequence based at least in part on a mapping between the subset of the plurality of orthogonal sequences and the plurality of bits.

Aspect 17: The method of aspect 16, further comprising: generating the plurality of orthogonal sequences based at least in part on a product of an orthogonal matrix having a size corresponding to the number of time periods and a cyclically shifted cell-specific sequence having a length corresponding to the number of frequency tones.

Aspect 18: The method of aspect 17, further comprising: identifying a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence.

Aspect 19: The method of aspect 18, further comprising: determining the subset of the plurality of orthogonal sequences based at least in part on the first number, the first starting index, the first index interval, the second number, the second starting index, and the second index interval.

Aspect 20: The method of any of aspects 18 through 19, further comprising: determining a first number of indices associated with the orthogonal matrix based at least in part on the first number; and determining a second number of indices associated with the cyclically shifted cell-specific sequence based at least in part on the second number.

Aspect 21: The method of aspect 20, wherein the first index interval comprises a function of the number of time periods and the first number of indices and the second index interval comprises a function of the number of frequency tones and the second number of indices.

Aspect 22: The method of any of aspects 18 through 21, further comprising: transmitting an indication of the first number, an indication of the second number, an indication of the first starting index, an indication of the second starting index, an indication of the first index interval, an indication of the second index interval, or any combination thereof.

Aspect 23: The method of any of aspects 18 through 22, wherein a summation of the first number associated with the orthogonal matrix and the second number associated with the cyclically shifted cell-specific sequence equals the number of the plurality of bits.

Aspect 24: The method of aspect 17, further comprising: identifying a set of joint indices based at least in part on a product of the number of time periods and the number of frequency tones.

Aspect 25: The method of aspect 24, further comprising: identifying a third starting index associated with the set of joint indices and a third index interval associated with the set of joint indices; and determining the subset of the plurality of orthogonal sequences based at least in part on the third starting index and the third index interval.

Aspect 26: The method of aspect 25, further comprising: transmitting an indication of the third starting index and an indication of the third index interval.

Aspect 27: The method of any of aspects 16 through 26, wherein the subset of the plurality of orthogonal sequences comprises a codebook for conveying the payload comprising the plurality of bits.

Aspect 28: An apparatus for wireless communications at a wireless device, comprising a processor; memory coupled with the processor; and instructions stored in the memory and executable by the processor to cause the apparatus to perform a method of any of aspects 1 through 15.

Aspect 29: An apparatus for wireless communications at a wireless device, comprising at least one means for performing a method of any of aspects 1 through 15.

Aspect 30: A non-transitory computer-readable medium storing code for wireless communications at a wireless device, the code comprising instructions executable by a processor to perform a method of any of aspects 1 through 15.

Aspect 31: An apparatus for wireless communications at a wireless device, comprising a processor; memory coupled with the processor; and instructions stored in the memory and executable by the processor to cause the apparatus to perform a method of any of aspects 16 through 27.

Aspect 32: An apparatus for wireless communications at a wireless device, comprising at least one means for performing a method of any of aspects 16 through 27.

Aspect 33: A non-transitory computer-readable medium storing code for wireless communications at a wireless device, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a wireless device, comprising:
   identifying a plurality of orthogonal sequences for conveying a payload comprising a plurality of bits, wherein a number of the plurality of orthogonal sequences is based at least in part on a number of time periods for conveying the payload and a number of frequency tones for conveying the payload;

selecting a subset of the plurality of orthogonal sequences for conveying the payload, wherein a size of the subset of the plurality of orthogonal sequences is based at least in part on a number of the plurality of bits;

selecting a sequence from the subset of the plurality of orthogonal sequences based at least in part on a mapping between the subset of the plurality of orthogonal sequences and the plurality of bits; and transmitting the payload comprising the plurality of bits using the selected sequence.

2. The method of claim 1, further comprising:
generating the plurality of orthogonal sequences based at least in part on a product of an orthogonal matrix having a size corresponding to the number of time periods and a cyclically shifted cell-specific sequence having a length corresponding to the number of frequency tones.

3. The method of claim 2, further comprising:
identifying a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence.

4. The method of claim 3, further comprising:
determining the subset of the plurality of orthogonal sequences based at least in part on the first number, the first starting index, the first index interval, the second number, the second starting index, and the second index interval.

5. The method of claim 3, further comprising:
determining a first number of indices associated with the orthogonal matrix based at least in part on the first number; and
determining a second number of indices associated with the cyclically shifted cell-specific sequence based at least in part on the second number.

6. The method of claim 5, wherein the first index interval comprises a function of the number of time periods and the first number of indices and the second index interval comprises a function of the number of frequency tones and the second number of indices.

7. The method of claim 3, further comprising:
receiving an indication of the first number, an indication of the second number, an indication of the first starting index, an indication of the second starting index, an indication of the first index interval, an indication of the second index interval, or any combination thereof.

8. The method of claim 3, further comprising:
determining the first index interval based at least in part on a maximum index interval for indices of the orthogonal matrix; and
determining the second index interval based at least in part on a maximum index interval for indices of the cyclically shifted cell-specific sequence.

9. The method of claim 3, wherein a summation of the first number associated with the orthogonal matrix and the second number associated with the cyclically shifted cell-specific sequence equals the number of the plurality of bits.

10. The method of claim 2, further comprising:
identifying a set of joint indices based at least in part on a product of the number of time periods and the number of frequency tones.

11. The method of claim 10, further comprising:
identifying a third starting index associated with the set of joint indices and a third index interval associated with the set of joint indices; and
determining the subset of the plurality of orthogonal sequences based at least in part on the third starting index and the third index interval.

12. The method of claim 11, further comprising:
receiving an indication of the third starting index and an indication of the third index interval.

13. The method of claim 11, further comprising:
determining the third index interval based at least in part on a maximum index interval for indices of the set of joint indices.

14. The method of claim 2, further comprising:
converting the plurality of bits into a decimal number, wherein the mapping between the subset of the plurality of orthogonal sequences and the plurality of bits is based at least in part on a second mapping between the decimal number and an index of the subset of the plurality of orthogonal sequences.

15. The method of claim 1, wherein the subset of the plurality of orthogonal sequences comprises a codebook for conveying the payload comprising the plurality of bits.

16. A method for wireless communications at a wireless device, comprising:
identifying a plurality of orthogonal sequences for conveying a payload comprising a plurality of bits, wherein a number of the plurality of orthogonal sequences is based at least in part on a number of time periods for conveying the payload and a number of frequency tones for conveying the payload;

determining a subset of the plurality of orthogonal sequences for conveying the payload, wherein a size of the subset of the plurality of orthogonal sequences is based at least in part on a number of the plurality of bits; and receiving the payload comprising the plurality of bits using a selected sequence from the subset of the plurality of orthogonal sequences, the selected sequence based at least in part on a mapping between the subset of the plurality of orthogonal sequences and the plurality of bits.

17. The method of claim 16, further comprising:
generating the plurality of orthogonal sequences based at least in part on a product of an orthogonal matrix having a size corresponding to the number of time periods and a cyclically shifted cell-specific sequence having a length corresponding to the number of frequency tones.

18. The method of claim 17, further comprising:
identifying a first number associated with the orthogonal matrix, a first starting index associated with the orthogonal matrix, a first index interval associated with the orthogonal matrix, a second number associated with the cyclically shifted cell-specific sequence, a second starting index associated with the cyclically shifted cell-specific sequence, and a second index interval associated with the cyclically shifted cell-specific sequence.

19. The method of claim 18, further comprising:
determining the subset of the plurality of orthogonal sequences based at least in part on the first number, the first starting index, the first index interval, the second number, the second starting index, and the second index interval.

20. The method of claim 18, further comprising:
determining a first number of indices associated with the orthogonal matrix based at least in part on the first number; and
determining a second number of indices associated with the cyclically shifted cell-specific sequence based at least in part on the second number.

21. The method of claim 20, wherein the first index interval comprises a function of the number of time periods and the first number of indices and the second index interval comprises a function of the number of frequency tones and the second number of indices.

22. The method of claim 18, further comprising:
transmitting an indication of the first number, an indication of the second number, an indication of the first starting index, an indication of the second starting index, an indication of the first index interval, an indication of the second index interval, or any combination thereof.

23. The method of claim 18, wherein a summation of the first number associated with the orthogonal matrix and the second number associated with the cyclically shifted cell-specific sequence equals the number of the plurality of bits.

24. The method of claim 17, further comprising:
identifying a set of joint indices based at least in part on a product of the number of time periods and the number of frequency tones.

25. The method of claim 24, further comprising:
identifying a third starting index associated with the set of joint indices and a third index interval associated with the set of joint indices; and
determining the subset of the plurality of orthogonal sequences based at least in part on the third starting index and the third index interval.

26. The method of claim 25, further comprising:
transmitting an indication of the third starting index and an indication of the third index interval.

27. The method of claim 16, wherein the subset of the plurality of orthogonal sequences comprises a codebook for conveying the payload comprising the plurality of bits.

28. An apparatus for wireless communications at a wireless device, comprising:
a processor,
memory coupled with the processor; and
instructions stored in the memory and executable by the processor to cause the apparatus to:
identify a plurality of orthogonal sequences for conveying a payload comprising a plurality of bits, wherein a number of the plurality of orthogonal sequences is based at least in part on a number of time periods for conveying the payload and a number of frequency tones for conveying the payload;
select a subset of the plurality of orthogonal sequences for conveying the payload, wherein a size of the subset of the plurality of orthogonal sequences is based at least in part on a number of the plurality of bits;
select a sequence from the subset of the plurality of orthogonal sequences based at least in part on a mapping between the subset of the plurality of orthogonal sequences and the plurality of bits; and
transmit the payload comprising the plurality of bits using the selected sequence.

29. The apparatus of claim 28, wherein the instructions are further executable by the processor to cause the apparatus to:
generate the plurality of orthogonal sequences based at least in part on a product of an orthogonal matrix having a size corresponding to the number of time periods and a cyclically shifted cell-specific sequence having a length corresponding to the number of frequency tones.

30. An apparatus for wireless communications at a wireless device, comprising:
a processor,
memory coupled with the processor; and
instructions stored in the memory and executable by the processor to cause the apparatus to:
identify a plurality of orthogonal sequences for conveying a payload comprising a plurality of bits, wherein a number of the plurality of orthogonal sequences is based at least in part on a number of time periods for conveying the payload and a number of frequency tones for conveying the payload;
determine a subset of the plurality of orthogonal sequences for conveying the payload, wherein a size of the subset of the plurality of orthogonal sequences is based at least in part on a number of the plurality of bits; and
receive the payload comprising the plurality of bits using a selected sequence from the subset of the plurality of orthogonal sequences, the selected sequence based at least in part on a mapping between the subset of the plurality of orthogonal sequences and the plurality of bits.

* * * * *